United States Patent [19]

Peterman et al.

[11] Patent Number: 5,544,525
[45] Date of Patent: Aug. 13, 1996

[54] ATMOSPHERIC REMOTE SENSING INSTRUMENT SYSTEM

[75] Inventors: K. Russell Peterman, Boulder, Colo.; Michael V. Smith, Knoxville, Tenn.

[73] Assignee: Radian Corporation, Austin, Tex.

[21] Appl. No.: 357,723

[22] Filed: Dec. 16, 1994

Related U.S. Application Data

[63] Continuation-in-part of Ser. No. 288,939, Aug. 10, 1994.

[51] Int. Cl.$^6$ ............................................. G01W 1/00
[52] U.S. Cl. .................................. 73/170.13; 73/170.16
[58] Field of Search .......................... 73/170.13, 170.16; 342/22, 26, 52, 196; 367/87, 90, 99

[56] References Cited

U.S. PATENT DOCUMENTS

| | | | |
|---|---|---|---|
| 3,427,581 | 2/1969 | Hartman | 73/170.16 |
| 3,675,191 | 7/1972 | McAllister | 73/120.16 |
| 3,821,740 | 6/1974 | Ehrlich . | |
| 3,859,622 | 1/1975 | Hutchinson et al. . | |
| 3,860,928 | 1/1975 | Ehrlich . | |
| 3,889,533 | 6/1975 | Balser | 73/170.13 |
| 4,143,547 | 3/1979 | Balger | 367/90 |
| 4,207,620 | 6/1980 | Morgera . | |
| 4,219,887 | 8/1980 | MacGready, Jr. | 367/90 |
| 4,222,265 | 9/1980 | Ravussin | 73/170.16 |
| 4,286,462 | 9/1981 | Bourne . | |
| 4,336,606 | 6/1982 | Heard | 73/170.13 |
| 4,351,188 | 9/1982 | Fukushima et al. | 73/170.13 |
| 4,481,517 | 11/1984 | Brown | 367/87 |
| 4,558,594 | 12/1985 | Balser et al. . | |
| 4,647,933 | 3/1987 | Hogg | 342/26 |
| 4,761,650 | 8/1988 | Masuda | 342/26 |
| 4,831,874 | 5/1989 | Daubin et al. | 73/170.13 |
| 5,221,927 | 6/1993 | Palmer | 342/26 |
| 5,262,782 | 11/1993 | Rubin et al. | 342/26 |
| 5,434,570 | 7/1995 | Wurman | 342/26 |

FOREIGN PATENT DOCUMENTS

| | | | |
|---|---|---|---|
| 2499252 | 8/1982 | France . | |
| 5571448 | 1/1981 | Japan | 73/170.13 |

OTHER PUBLICATIONS

Adekola, Sulaiman Adeniya, *A Study of the Radiation Patterns of a Shielded Quasi–Tapered Aperature Antenna For Acoustic Echo–Sounding*, The Ohio State University, Ph.D. Thesis, 1975 (Xerox University Microfilms, copy furnished 1981), pp. cover; Authorization Page; Copyight page; i–iii; Apendix C; 196–216; Appendix D1; and 223–26.

*Primary Examiner*—Richard Chilcot
*Assistant Examiner*—R. Biegel
*Attorney, Agent, or Firm*—Klauber & Jackson

[57] ABSTRACT

A system of atmospheric remote sensing instruments that utilize a common phased-array acoustic antenna so as to take temperature and wind measurements over a wide range of altitudes. One of the atmospheric remote sensing instruments in the system is a monostatic SODAR that takes wind measurements by transmitting pulses of acoustic energy into the atmosphere and then measuring received reflected acoustic energy. The acoustic pulses are both transmitted and received by the common phased-array acoustic antenna. Another of the atmospheric remote sensing instruments in the system is a wind profiling radar that takes wind measurements by transmitting pulses of electromagnetic energy into the atmosphere and then measuring received backscattered electromagnetic energy. The pulses of electromagnetic energy are both transmitted and received by a phased-array radar antenna. The final atmospheric remote sensing instrument in the system is a RASS that takes temperature measurements by first transmitting acoustic energy into the atmosphere and then transmitting pulses of electromagnetic energy into the atmosphere. The acoustic energy is used as a target for the pulses of electromagnetic energy, and the resulting backscatter is received and measured. The acoustic energy is transmitted by the common phased-array acoustic antenna, while the pulses of electromagnetic energy are both transmitted and received by the phased-array radar antenna. It is within the province of the invention to combine the acoustic antenna and the radar antenna into a single entity.

16 Claims, 15 Drawing Sheets

ATMOSPHERIC REMOTE SENSING INSTRUMENT SYSTEM

This patent application is a continuation-in-part application of U.S. patent application Ser. No. 08/288,939, which was filed Aug. 10, 1994, now pending.

FIELD OF THE INVENTION

The present invention relates to atmospheric temperature and wind measuring devices and, more particularly, to a system of atmospheric remote sensing instruments that utilize a common phased-array acoustic antenna so as to require temperature and wind measurements.

DESCRIPTION OF THE PRIOR ART

Measuring wind profiles with altitude is necessary in order to provide the input data that meteorological and dispersion models require so as to produce the most accurate results. Weather forecasters have traditionally used weather balloons, and more recently weather satellites, to measure wind profiles to altitudes of 50 kilometers or more above ground level. In the lower atmosphere, however, balloons and satellites have difficulty providing the kind of high resolution, continuous measurements that are needed in meteorological modeling for air quality decisions such as permit approval or photochemical control strategy development. A practical answer to this measurement need, now in common use, is to measure the winds in the first few hundreds of meters above the ground using an instrument called a SODAR.

The term SODAR is an acronym for "Sound Detection And Ranging". It refers to an atmospheric remote sensing instrument that takes measurements in vertical profiles directly above the instrument's outdoor antenna system. These vertical profiles are commonly called soundings, and a SODAR is, therefore, commonly called an acoustic sounder. A SODAR is a remote sensing instrument because it measures the atmosphere above its antenna system remotely, which means that the instrument does not directly touch the air being measured. It takes the measurements by sending acoustic pulses upward and then measuring the acoustic energy and Doppler shift reflected back to the instrument by the atmosphere. Unlike a meteorological instrument that takes point measurements wherever it is positioned, a SODAR remotely measures a volume of air above its antenna system and averages over the volume in height intervals to provide a single reading for each height interval. The vertical extent of these single-height measurements is referred to as a wind profile.

Although several types of SODAR instruments exist, the present invention is concerned with a so called monostatic SODAR. A monostatic SODAR, such as that disclosed in U.S. Pat. No. 4,558,594, uses a single antenna system to both transmit acoustic signals upward into the atmosphere and to measure the reflection of those signals back from small scale turbulence (caused by small scale thermal gradients) in the air. While the characteristics of the antenna system can vary significantly by manufacturer, the basic technique requires that measurements be made sequentially and repetitively along three beam paths, one of which is vertical and the other two tilted slightly off vertical (oblique) and orthogonal to each other (i.e., the two tilted beams might point southeast and northeast, west and north, northwest and southwest, etc.). Standard measurements are made by transmitting a pulse along the first beam path, then waiting a few seconds for all reflected energy from the atmosphere to be received back at the antenna, then transmitting on the second beam path and waiting for all reflected energy, then transmitting on the third beam path and waiting for all reflected energy, then continuing to repeat this "ping" cycle continuously to accumulate measurements for averaging during automated data processing.

Alternative SODAR configurations use more than three beam paths to produce more reliable and accurate wind measurements. The data from the extra beam directions is used for cross-checking, to detect and compensate for erroneous radial wind samples. For example, a SODAR configuration using five beams could use one vertical beam path and four oblique orthogonal beams (e.g. the tilted beams might point east, north, west, and south). Similar to the manner described for the three beam configuration, pulses would be transmitted along each of the five beams in sequence and the echo signals would be analyzed so as to determine the radial winds along each of the beam axes. Three of the five measured radial winds (from the vertical, north, and south beams) would contain information about the north/south component of the wind, which can be computed from any two of these three values. The extra measurement is available for quality assurance computations, to determine whether the set of three radial winds is consistent with a set of north/south and vertical wind component values. In a similar manner, another subset of measured radial winds (from the vertical, east, and west beams) would contain redundant data for computing a verified east/west wind component. Signal processing algorithms can be used to reliably determine which radial wind samples are erroneous.

The approach just described may be applied to any configuration with four or more beams, as long as three independent beam directions are present. It is not necessary for subsets of three beam axes to be coplanar, as in the five beam example above. If that is the case, however, the calculations are simpler.

SODARs are commonly called "Doppler SODARs" because they use the frequency difference (called "Doppler shift") between the transmitted and the reflected acoustic energy to determine the movement of air that reflected the acoustic energy. The frequency shift from each beam path is converted into a radial wind along that path, and the radial winds from the respective beam paths are then combined (using mathematical computations) to produce horizontal wind direction and speed at designated height intervals in the vertical profile above the antenna system. The resultant horizontal wind direction and speed value for each vertical interval represents an average for the volume measured and over the time span designated by the operator. The size of the volume measured depends on the characteristics of the beams used and on the depth of the height intervals set by the operator. The SODAR assigns heights to the data according to length of time it took for the increments of the reflected acoustic energy to be received back at the antenna.

Using the wind data, some SODARs provide derivative information such as wind components (u,v,w), standard deviations ($\sigma w$, $\sigma \theta$, $\sigma \phi$), and stability class estimates (Showalter Classes A–F). In addition to analyzing for Doppler shift to estimate winds, SODARs also commonly record the strength of the-reflected acoustic energy, called "backscatter." When displayed in time-height cross section, "backscatter" data recorded by the SODAR show atmospheric thermal structure patterns that can be interpreted by either automated software algorithms or a meteorologist to provide estimates of mixing heights, a feature particularly important to air pollution applications.

The primary factors influencing SODAR performance are atmospheric conditions, siting conditions, and the configuration of the SODAR system being used. Atmospheric and siting conditions dictate how much reflected atmospheric "signal" a SODAR will be able to correctly recognize. Since acoustic energy attenuates rapidly with distance, the height measurement capability of a SODAR will improve and degrade over time as the capacity of the atmosphere to strongly reflect acoustic signals changes. Also, since the SODAR will "hear" noises from both the atmosphere (e.g., rain) and other sources (e.g., automobile traffic) within its transmit frequency range, the height capability of a SODAR will vary according to the strength of the background noise of the atmosphere and siting environment in which it is operating. The adverse impact of background noise can be reduced somewhat by use of an acoustic cuff around the antenna array. Also important in the siting environment is the presence or absence of nearby structures that may reflect acoustic energy back into the antenna system and interfere with its operation. An operator can usually control the height sensing capability of a SODAR to a certain extent according to the configuration of the particular SODAR system being used. The most important factor in this area is the "pulse length," which helps control how much acoustic energy is transmitted. The longer the pulse length chosen, the more energy transmitted. Longer pulse lengths help reach to greater measurement heights, but also raise the minimum altitude that can be accurately measured and the minimum vertical interval that can be measured. An operator can usually also influence sensing height capability by the length of the time averaging period used for data measurements. For example, setting a particular SODAR system to record 15 minute average winds will normally allow greater sensing altitude than 5 minute average winds because it increases the probability that usable reflected energy samples will be recorded at the upper sensing altitudes during the time averaging period (simply because the averaging period is longer). Also longer averaging times can benefit signal processing by tending to improve both data quality and altitude coverage. An operator can usually also set the receiver gain according to the sensing height desired. The maximum gain setting would normally be used when the emphasis is on sensing as high as possible. Conversely, reducing the gain can be helpful when the emphasis is on the lower sensing altitudes, as a gain setting too high can contribute to receiver saturation causing data loss in the lower gates. Regarding height sensing capability in general, the condition of the atmosphere is the single greatest factor in determining to what height data can be collected. Limiting atmospheric conditions include wind speeds and the presence or absence of small-scale thermal gradients. Wind speeds are important in that strong winds tend to blow the transmitted acoustic beams laterally and the reflected acoustic energy from greater heights may therefore also be laterally displayed and not received back at the antenna. Small-scale thermal gradients are important, because a monostatic Doppler SODAR relies on the presence of these gradients to reflect the acoustic energy back to the antenna. This means that when the atmosphere is well mixed, sensing conditions are relatively poor. Well mixed conditions that occur throughout the sensing range of a SODAR result in only the lower gates being measurable, while well mixed conditions that occur in layers within the sensing range of a SODAR result in those layers not being measurable, whereas the lessor mixed layers above and below are measurable.

As previously stated, a SODAR is used to "listen" to the winds in the first few hundreds of meters above the ground. Above this first few hundreds of meters another type of atmospheric remote sensing instrument, called a wind profiling radar, has been employed to measure wind changes with altitude. Such a wind profiling radar may be used in place of, or in conjunction with, weather balloons and/or weather satellites.

A wind profiling radar operates by transmitting a pulse of electromagnetic energy in a chosen direction. When the pulse encounters a "target," electromagnetic energy is scattered, A small portion of this scattered energy, called backscatter, will return to the radar, which will then compute the distance to the target from the time delay between the transmission and reception of the echo. Referring to FIG. 1, a diagram of this backscattering process is shown.

The generic name "profiler" comes from the radar's ability to show data for many heights of the atmosphere at the same time, thus giving a profile of the atmosphere. The profile from equally-spaced heights is created by sampling backscatter at equally-spaced time intervals. The narrow spans of time during which backscatter is sampled are called range gates. All data from a selected time span are placed into a corresponding range gate. Referring to FIG. 2, the atmosphere above a profiler is shown divided into range gates, wherein all data from the same time span are placed into the same range gate.

Of course, backscatter is arriving from a volume of the atmosphere; a space rather than a single point. The size in the radial direction of this volume, also called the vertical volume, is referred to as the range or spatial resolution of the radar. The height assigned to the range gate is the center of the resolution volume or cell. Referring to FIG. 3, a representation of a resolution cell is shown. The smaller the vertical size of the volume, the finer the range resolution of the profiler. The range resolution is determined by the time duration of the pulse the profiler transmits. A short pulse gives a fine range resolution, and a long pulse gives a coarse range resolution.

A wind profiling radar uses refractive irregularities in the atmosphere as targets. A refractive irregularity is anything that can change the course of a wave through a medium. In this case, the medium is the atmosphere, and the wave is the radio frequency wavelength that the profiler transmits. Backscattering occurs with irregularities about half the size of the radar wavelength, which is referred to as the "Bragg length".

The atmosphere has a deceptively turbulent topography, powered by wind and the uneven heating of the Earth's surface. This motion in the atmosphere creates variations in temperature, humidity, and pressure over relatively short distances. The variations, called eddies, can start out quite large, but because they are unstable, will break up into smaller and smaller eddies with height above ground. These smaller eddies are the refractive irregularities that the profiler uses as targets.

Tracking refractive irregularities, which are carried by the wind, reveals information about the wind itself. As mentioned before, the profiler computes height by using the time interval between transmission of the pulse and reception of the echo. However, wind speed and direction are determined by using the Doppler principle, which means that a wave will shift in frequency because of the motions of the target relative to the observer. A frequency higher than the transmitted frequency indicates that the wind is moving towards the profiler. A frequency lower than the transmitted frequency indicates that wind is moving away from the profiler. The profiler detects these small shifts in the frequency of the backscatter and translates them into wind velocity data.

A typical wind profiling radar makes measurements in five directions in order to compute wind measurements (speed and direction). The transmitted pulse in each direction typically has a beam width of less than ten degrees. One beam is directed vertically. The four oblique beams are tilted between 15–23.5 degrees from vertical and directed in the four orthogonal directions. Referring to FIG. 4, there are shown the antenna pointing directions of the typical wind profiling radar. It is preferable to use a phased-array antenna having several radiating elements for the transmission of each of the electromagnetic pulse beams.

The beam sequence, including the number of beams and the order in which they are transmitted, is operator-controlled but normally should include the vertical beam and at least two tilted orthogonal beams for the Doppler shift computations to work. A complete rotation through the beam sequence is called a sample. For each range gate, many samples are processed together to obtain an average for each range gate.

Similar to the importance of accurately measuring wind changes with altitude so as to obtain accurate results in meteorological models, it is also important to accurately measure temperature changes with altitude. As described in *RASS Temperature Sounding Techniques*, United States Department of Commerce, National Oceanic and Atmospheric Administration (NOAA), Environmental Research Laboratories (ERL), Wave Propagation Laboratory (WPL), NOAA Technical Memorandum ERL WPL-158, December 1988, a Radio Acoustic Sounding System (RASS) may be implemented with a wind profiling radar so as to measure temperature profiles to several kilometers above ground level. More specifically, a RASS may be used with a wind profiling radar so as to provide profiles of virtual temperature data.

Virtual temperature is a temperature measurement that is uncompensated for humidity or pressure. A RASS traditionally comprises four acoustic sources, one on each side of the wind profiling radar as shown in FIG. 5, which transmit vertically directed acoustic waves. The profiler uses the acoustic waves as targets and receives and processes the resulting backscatter. From the backscatter, the profiler measures the speed of propagation of the acoustic waves. The profiler can compute virtual temperature profiles because the speed of sound is easily related to air temperature.

It is apparent from the above description that both a RASS and a SODAR require the use of at least one acoustic source. It is also apparent from the above description that both a wind profiling radar and a RASS require the use of a radar antenna. Thus, it would be beneficial to combine all of these atmospheric remote sensing instruments so as to take temperature and wind measurements over a wide range of altitudes.

SUMMARY OF THE INVENTION

The present invention contemplates a system of atmospheric remote sensing instruments that utilize a common phased-array acoustic antenna so as to take temperature and wind measurements over a wide range of altitudes. One of the atmospheric remote sensing instruments in the system is a monostatic SODAR that takes wind measurements by transmitting pulses of acoustic energy into the atmosphere and then measuring received reflected acoustic energy. The acoustic pulses are both transmitted and received by the common phased-array acoustic antenna. Another of the atmospheric remote sensing instruments in the system is a wind profiling radar that takes wind measurements by transmitting pulses of electromagnetic energy into the atmosphere and then measuring received backscattered electromagnetic energy. The pulses of electromagnetic energy are both transmitted and received by a phased-array radar antenna. The final atmospheric remote sensing instrument in the system is a RASS that takes temperature measurements by first transmitting acoustic energy into the atmosphere and then transmitting pulses of electromagnetic energy into the atmosphere. The acoustic energy is used as a target for the pulses of electromagnetic energy, and the resulting backscatter is received and measured. The acoustic energy is transmitted by the common phased-array acoustic antenna, while the pulses of electromagnetic energy are both transmitted and received by the phased-array radar antenna. It should be noted that the use of the common phased-array acoustic antenna in the RASS allows the acoustic energy to be steered so as to compensate for the detrimental driving effects (advection) of wind.

The SODAR takes wind measurements in the first few hundreds of meters above the ground, while the wind profiling radar takes wind measurements above these first few hundreds of meters up to several kilometers. The RASS takes temperature measurements from the first few hundreds of meters above the ground up to several kilometers. Thus, the present invention system of atmospheric remote sensing instruments allows temperature and wind measurements to be taken over a wide range of altitudes.

Accordingly, the primary objective of the present invention is to provide a system of atmospheric remote sensing instruments that utilize a common phased-array acoustic antenna so as to take temperature and wind measurements over a wide range of altitudes.

Other objectives and advantages of the present invention will become apparent to those skilled in the art upon reading the following detailed description and claims, in conjunction with the accompanying drawings which are appended hereto.

BRIEF DESCRIPTION OF THE DRAWINGS

In order to facilitate a fuller understanding of the present invention, reference is now be made to the appended drawings. The drawings should not be construed as limiting the present invention, but are intended to be exemplary only.

PREFERRED EMBODIMENTS OF THE PRESENT INVENTION

Figure 1:
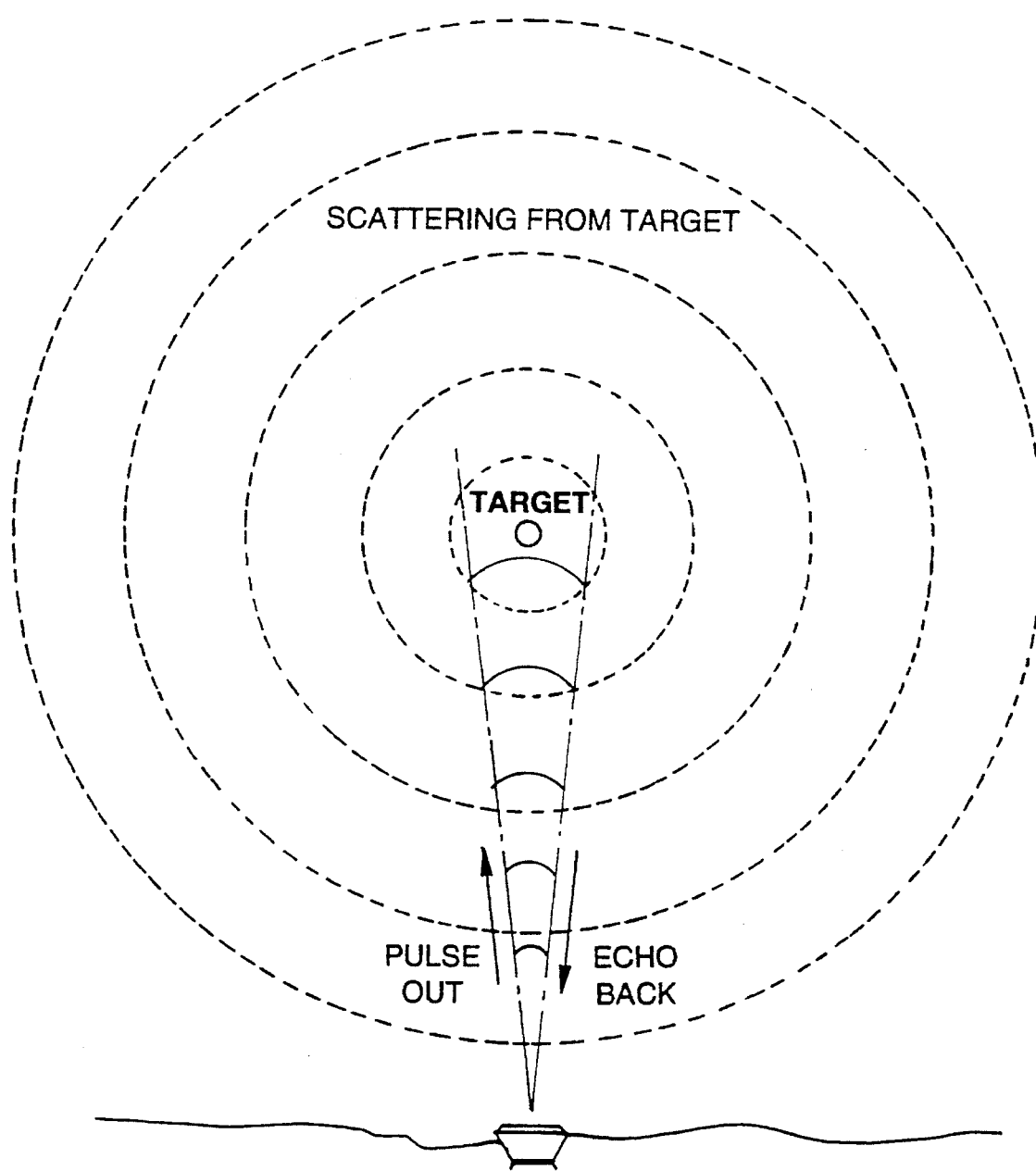
FIG. 1 is an illustration of the backscattering process involved in a typical wind profiling radar system.
Figure 2:
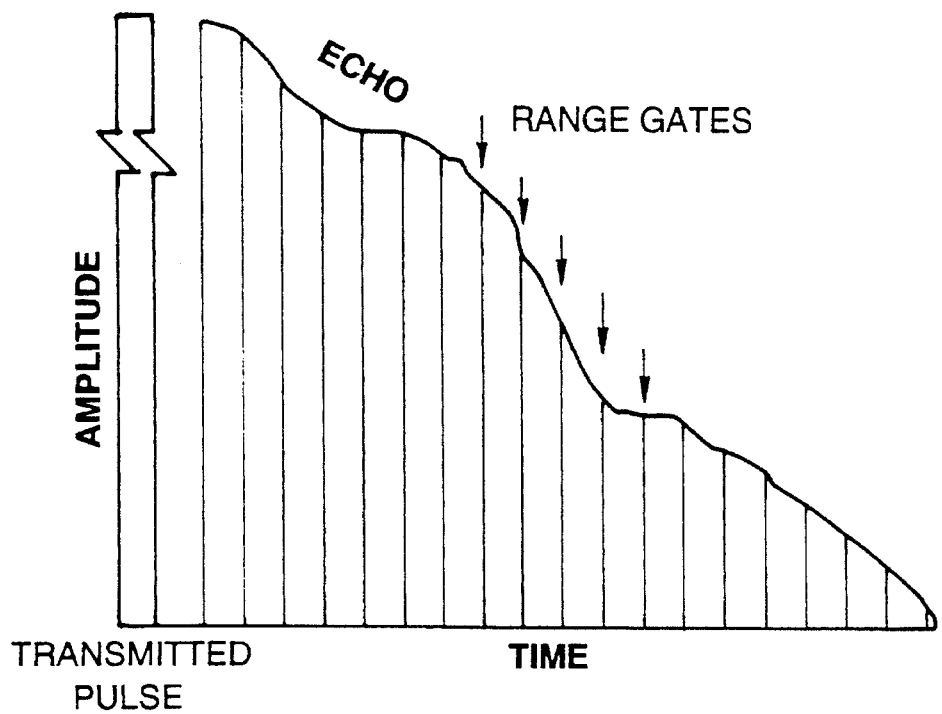
FIG. 2 is an illustration of the temporal sampling of the atmosphere above a typical wind profiling radar system.
Figure 3:
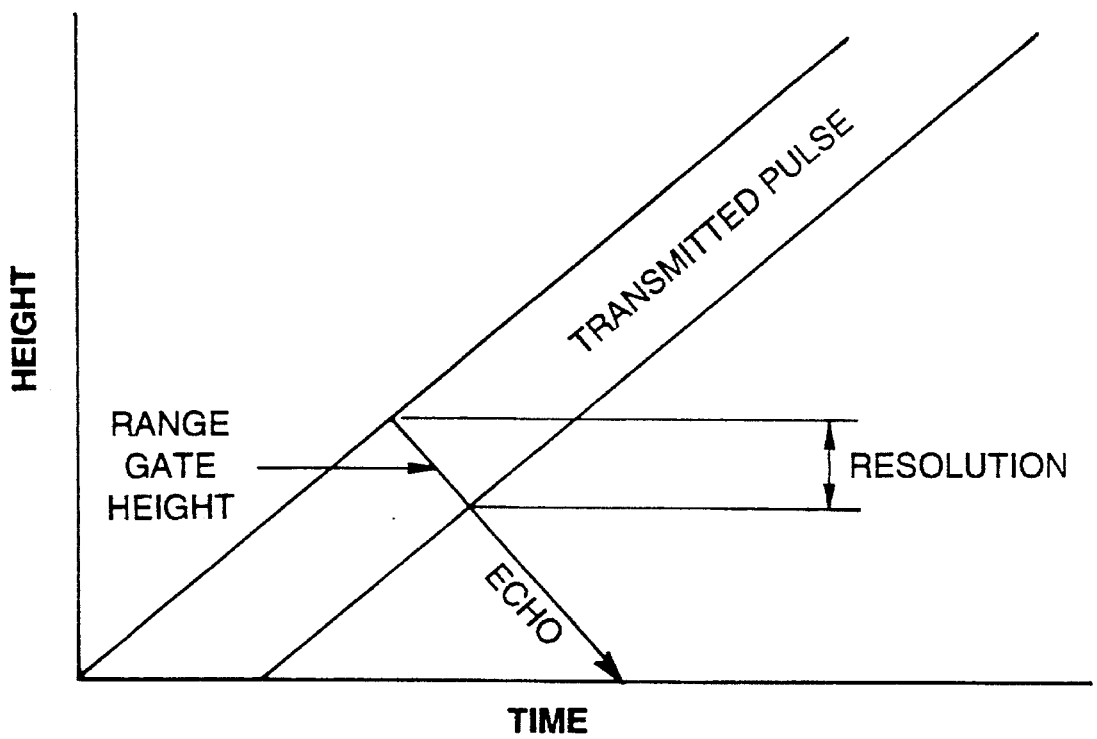
FIG. 3 is an illustration of a resolution cell as a function of height above ground for a typical wind profiling radar system.
Figure 4:
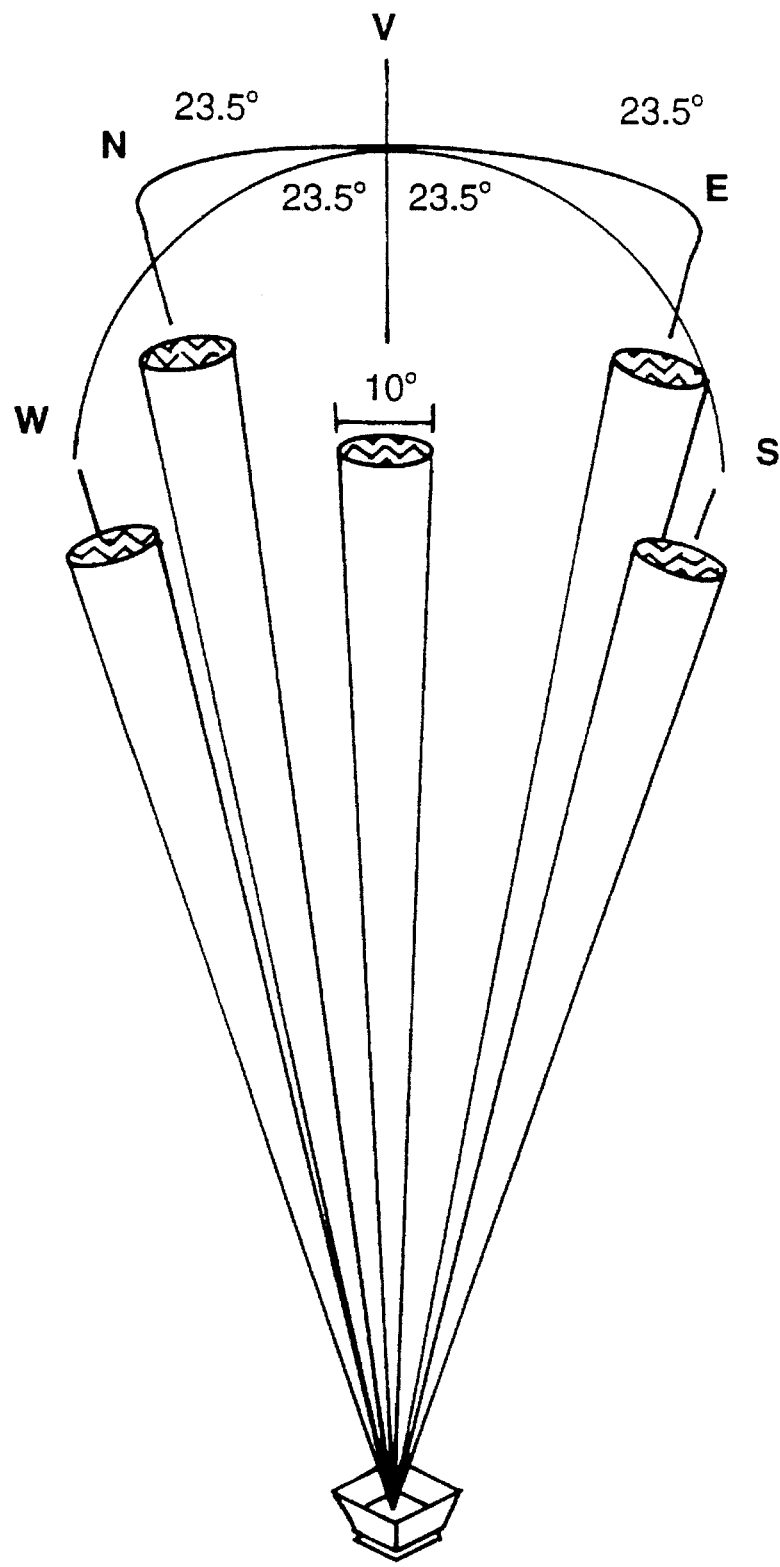
FIG. 4 is an illustration of the antenna pointing directions for a typical wind profiling radar system.
Figure 5:
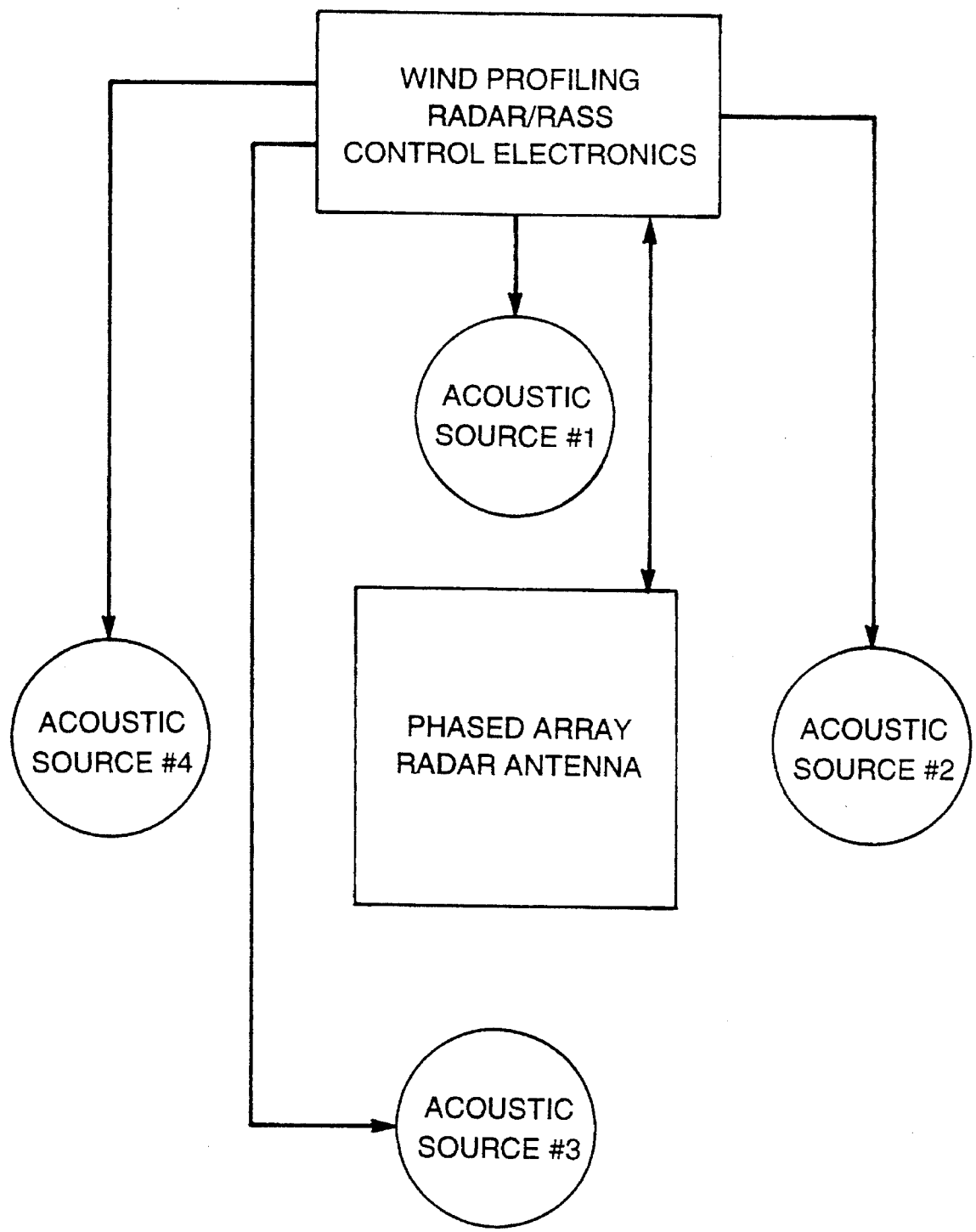
FIG. 5 is a schematic layout of a RASS implemented with a conventional wind profiling radar.
Figure 6:
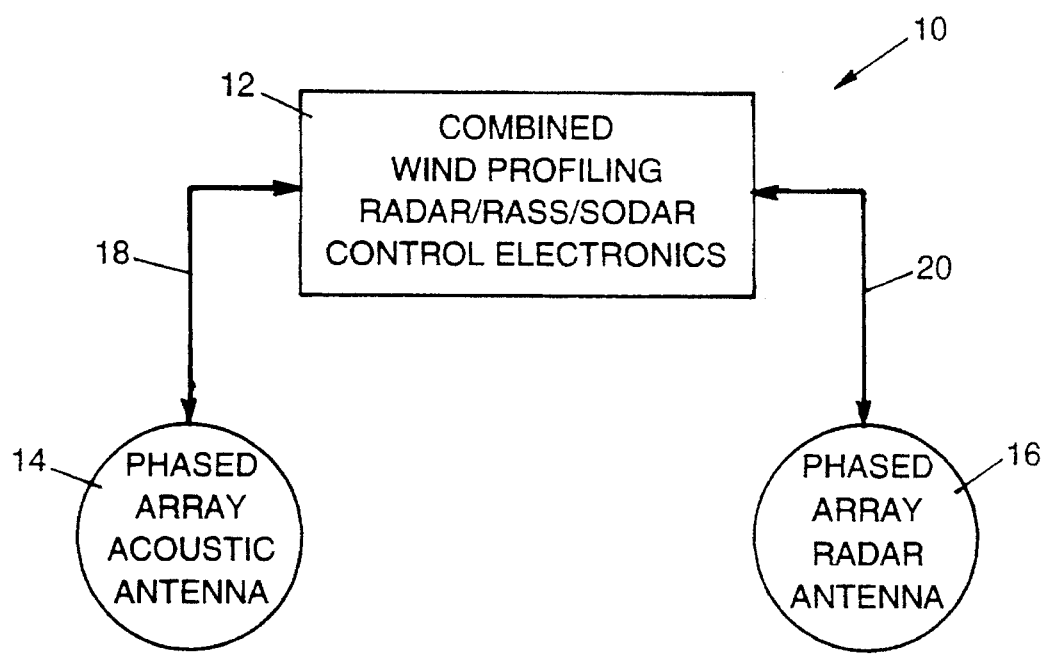
FIG. 6 is a schematic representation of a first embodiment of a system of atmospheric remote sensing instruments that utilize a common phased-array acoustic antenna so as to take temperature and wind measurements over a wide range of altitudes according to the present invention.

Referring to FIG. 6, there is shown a schematic representation of a first embodiment of a system 10 of atmospheric remote sensing instruments that utilize a common phased-array acoustic antenna so as to take temperature and wind measurements over a wide range of altitudes according to the present invention. The system 10 comprises combined wind profiling radar/RASS/SODAR control electronics 12, a phased array acoustic antenna 14, and a phased array radar antenna 16. The combined control electronics 12, the specifics of which are described hereinafter, communicate with the phased array acoustic antenna 14 and the phased array radar antenna 16 via communication lines 18 and 20, respectively. These communication lines 18,20 may be RS-422 based, RS-232 based, ethernet based, or a variety of other electronic communication protocols.

Figure 7:
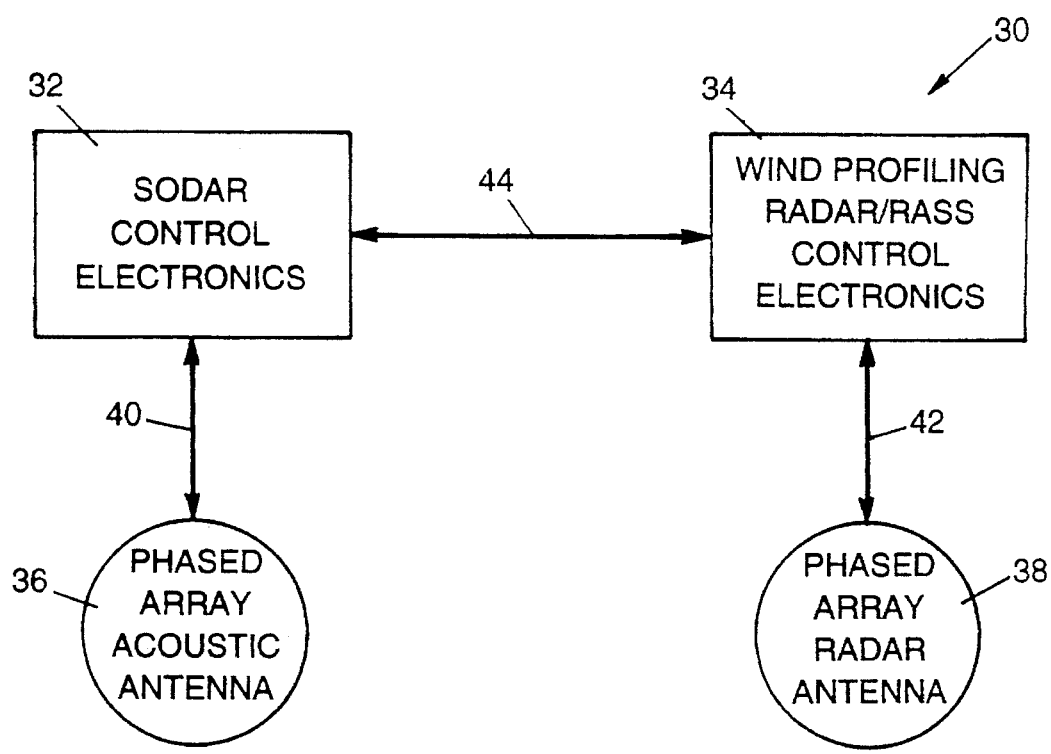
FIG. 7 is a schematic representation of a second embodiment of a system of atmospheric remote sensing instruments that utilize a common phased-array acoustic antenna so as to take temperature and wind measurements over a wide range of altitudes according to the present invention.

Referring to FIG. 7, there is shown a schematic representation of a second embodiment of a system 30 of atmospheric remote sensing instruments that utilize a common phased-array acoustic antenna so as to take temperature and wind measurements over a wide range of altitudes according to the present invention. The system 30 comprises SODAR control electronics 32, combined wind profiling radar/RASS control electronics 34, a phased array acoustic antenna 36, and a phased array radar antenna 38. The SODAR control electronics 32, the specifics of which are described hereinafter, communicate with the phased array acoustic antenna 36 via communication line 40. The combined wind profiling radar/RASS control electronics 34, the specifics of which are described hereinafter, communicate with the phased array radar antenna 38 via communication line 42. The SODAR control electronics 32 and the combined wind profiling radar/RASS control electronics 34 communicate with each other via communication line 44. As with the communication lines 18,20 in the first system embodiment 10, these communication lines 40,42,44 may be RS-422 based, RS-232 based, ethernet based, or a variety of other electronic communication protocols.

At this point it should be noted that although the phased array acoustic antenna is shown in FIGS. 6 and 7 as an entity which is separate from the phased array radar antenna, it is within the province of the invention to combine the phased array acoustic antenna and the phased array radar antenna into one physical entity.

The SODAR control electronics 32, the phased array acoustic antenna 36, and communication line 40 comprise essentially those components which are described in U.S. patent application Ser. No. 08/288,939, entitled Phased Array Acoustic Antenna System, which was filed Aug. 10, 1994, is the parent application of this application, and is hereby incorporated by reference. Of course, in addition to those components described in U.S. patent application Ser. No. 08/288,939, the SODAR control electronics 32 must also provide electronics which support communications with the combined wind profiling radar/RASS control electronics 34 over communication line 44. These additional electronics allow the combined wind profiling radar/RASS control electronics 34 to command the phased array acoustic antenna 36 so as to perform RASS functions. These RASS functions will now be described, along with the functions of the wind profiling radar.

Figure 8:
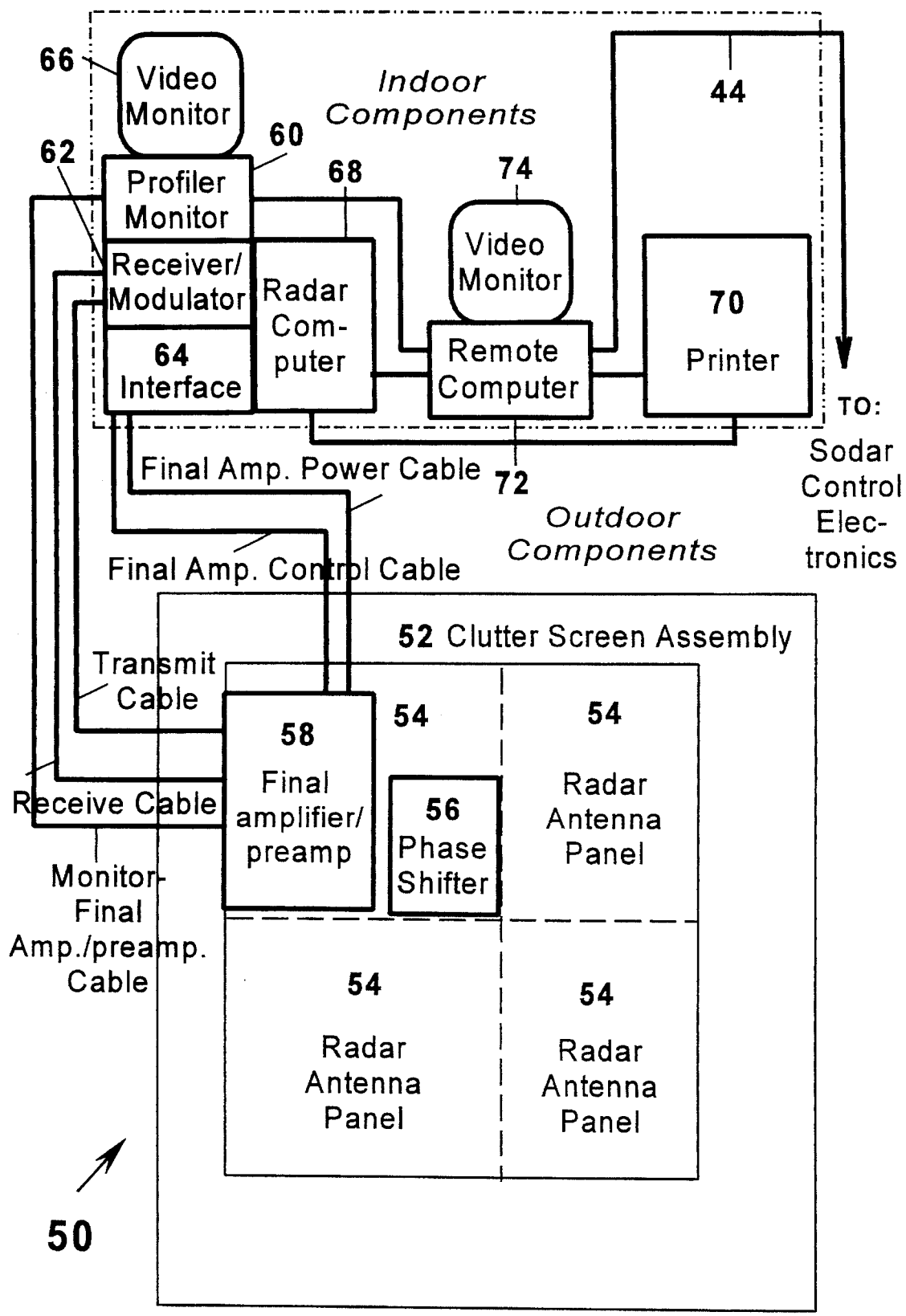
FIG. 8 is a schematic diagram of a typical wind profiling radar system.

Since a RASS is generally used as an add-on with a wind profiling radar, the components of the wind profiling radar will be described first and the RASS components will be described as they relate to the components of the wind profiling radar. Referring to FIG. 8, there is shown a schematic diagram of a typical wind profiling radar system 50 comprising a clutter screen assembly 52, a plurality of radar antenna panels 54, a phase shifter 56, a final amplifier/preamplifier 58, a profiler monitor 60, a receiver/modulator 62, an interface 64, a video monitor 66, a radar computer 68, a printer 70, and a remote computer 72 with a video monitor 74 or various combinations thereof.

Figure 9:
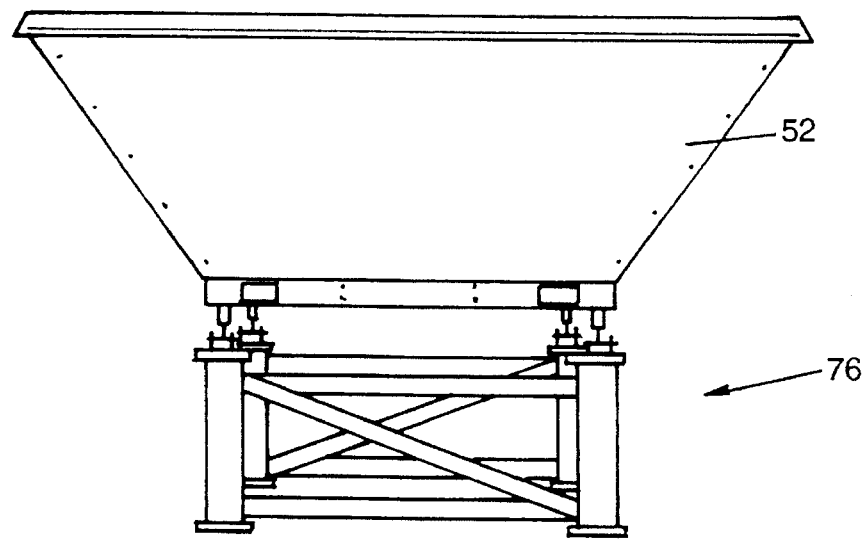
FIG. 9 is a side view of a clutter screen assembly for the wind profiling radar system of FIG. 8.

Referring to FIG. 9, there is shown a side view of the clutter screen assembly 52, which is typically a four-sided fiberglass wall surrounding the radar antenna panels 54. Comprising eight portable panels 1.7 meters (5.5 ft.) tall when bolted together, the clutter screen assembly 52 helps lessen the wind profiler's susceptibility to signal contamination from ground clutter. The clutter screen assembly 52 also provides the support structure for the radar antenna panels. The clutter screen assembly 52 provides significant improvement in clutter rejection up to 20° elevation above the horizon.

The clutter screen assembly 52 is mounted on a support stand 76. The support stand 76 raises the profiling system above the elements and allows clearance for the radar antenna panels 54 inside the clutter screen assembly 52 to pivot to a vertical position for maintenance purposes.

Figure 10:
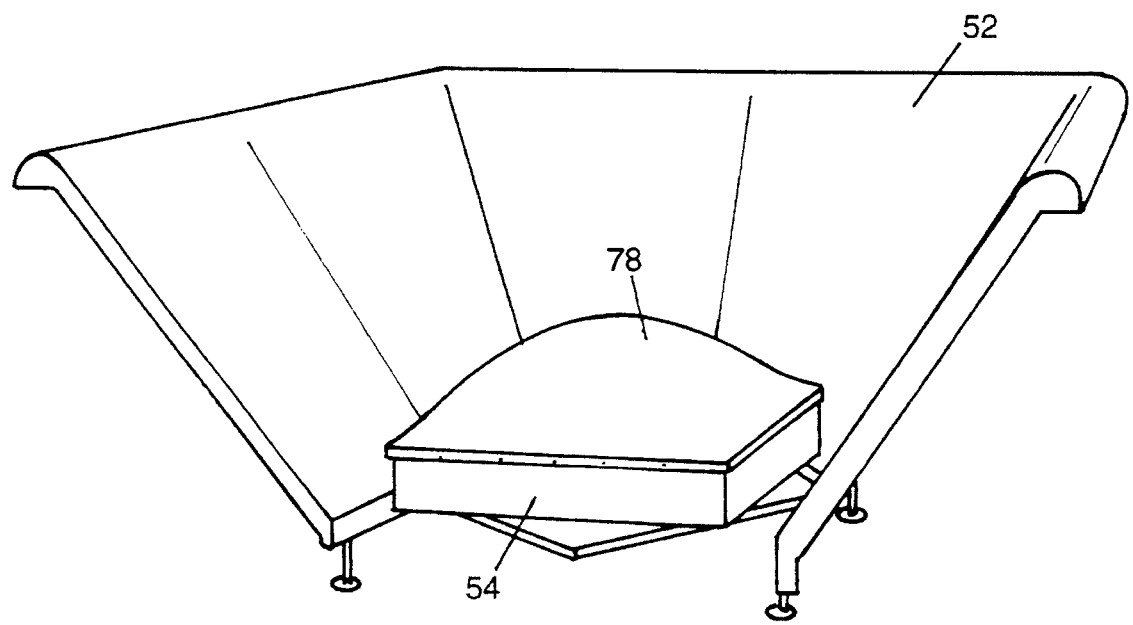
FIG. 10 is a three-dimensional partial cutaway perspective view of the clutter screen assembly shown in FIG. 9 therein revealing a plurality of radar antenna panels.

Referring to FIG. 10, these is shown a three-dimensional partial cutaway perspective view of the clutter screen assembly 52 revealing the plurality of radar antenna panels 54, which are oriented horizontally inside the clutter screen assembly 52. A fiberglass radome 78 protects the antenna panels from direct exposure. Each antenna panel 54 is typically 0.82 m by 0.82 m, which is 0.67 meters square, and comprises 16 micropatch elements combined in rows (X and Y). This particular panel structure results in an operating frequency of 915 MHz. It should be noted, however, that other operating frequencies may be utilized. The four panels 54 are arranged in a square array. The antenna array 54 is used both to radiate the radio pulse into the atmosphere and to receive the return reflections. The antenna panels 54 and the phase shifter 56 combine to allow the antenna system to point vertically and in four tilted orthogonal directions.

The phase shifter 56 comprises power divider/combiners and electrically switchable delay lines. Its purpose is to direct the RF signals to and from the final amplifier/preamplifier 58 and to and from the rows of antenna elements in the antenna panels 54. The phase shifter 56 also controls the pointing direction of the antenna by controlling the axis (X and Y) and the phased delays used. The phase shifter 56 is mounted to the antenna frame, beneath the antenna panels 54, and is connected to the antenna panels 54 using semi-rigid coaxial cable.

The final amplifier/preamplifier 58 is also mounted to the antenna frame beneath the antenna panels 54. The final amplifier/preamplifier 58 comprises a final RF amplifier, a T/R switch, a low-noise preamplifier, an oscillator, and intermediate frequency (IF) conversion components. The final amplifier/preamplifier 58 is involved in the signal processing of both the transmit and receive signals.

For the transmit signal, a 60 MHz IF signal from the receiver/modulator 62 is mixed with an 855 MHz signal from the oscillator, resulting in a pulse at 915 MHz. As previously mentioned, other frequencies are also possible. The final RF amplifier increases the amplitude of the pulse to 600 Watts peak (100 W average, maximum). The T/R switch directs the pulse to the phase shifter 56 and antenna panels 54.

For the receive signal, the return reflection from the atmosphere (through the antenna panels 54 and phase shifter 56) is directed by the T/R switch to the low noise preamplifier. The preamplifier has a noise figure value less than 1.2 dB. The return signal is mixed with the oscillator signal (855 MHz), resulting in an IF (60 MHz) signal that is amplified and then sent to the receive input of the receiver/modulator 62.

The profiler monitor 60 measures the operational parameters of the wind profiling radar 50 in real-time. If any operational parameter endangers the wind profiling radar 50, the profiler monitor 60 will disable the RF input to the final amplifier/preamplifier 58 and notify the remote computer 72.

The operational parameters measured in the indoor components comprise: 1.) the AC line voltage input to UPS; 2.) the AC line voltage output from UPS; and 3.) the shelter temperature. The operational parameters measured in the final amplifier/preamplifier 58 comprise: 1.) the forward peak RF output power; 2.) the reflected peak RF power; 3.) the final amplifier supply voltage; 4.) the final amplifier supply current; 5.) the oscillator/preamplifier supply voltage; 6.) the phase shifter supply voltage; 7.) three channels of the phase shifter relay current; 8.) the ambient air temperature; and 9.) the calculated antenna voltage.

The profiler monitor 60 performs self tests including memory, processor instruction tests, and A/D channel read tests, and reports the results to the remote computer 72. If the profiler monitor 60 fails, timers embedded in the processors in the profiler monitor 60 and the final amplifier/preamplifier 58 will reset and restart the profiler monitor 60.

The receiver/modulator 62 receives the signal return reflection from the atmosphere when a pulse is transmitted. The receiver comprises an input blanker, an IF amplifier/filter, a quadrature detector, switchable Bessel filters matched to the transmitted pulse length, and a local oscillator and modulator. The intermediate frequency is 60 MHz. The modulator comprises an oscillator, an amplitude modulator, and a phase modulator. The amplitude modulator uses a very high isolation RF switch for excellent off-state performance. The oscillator, which operates at 60 MHz, is highly stable with low phase noise.

The interface 64 provides the power supply voltages for the final amplifier/preamplifier 58 and an interface control board. The interface 64 also provides the control signals for the receiver/modulator 62 and the antenna phase shifter 56. The interface control board has buffered digital outputs for the control signals and a pair of 10-bit A-to-D converters for the receiver output. The interface 64 also displays the status of the antenna control outputs and the supply current for the final amplifier/preamplifier 58.

The wind profiler 50 uses two video monitors 66,74, one for the radar computer and one for the remote computer, respectively. Both video monitors 66,74 are VGA color monitors that accept video input from a VGA display adaptor. The video monitors 66,74 come with their own power cables and video signal cables.

The radar computer 68 is a third-party component adapted for use within the profiling system. The radar computer 68, which is typically based on a 486 DX ISA personal computer, is responsible for overall radar operation and data analysis. The nominal configuration for the radar computer 68 is: 1.) a 4 MB RAM; 2.) greater than 200 MB fixed disk drive; 3.) both 90 mm and 130 mm (3.5" and 5.25") disk drives; and 4.) a keyboard with mouse.

The ISA bus of the radar computer 68 is typically populated with several printed circuit boards that control radar operation, data computation, and communication. A radar controller board provides the pulse and logic sequence required to synchronize the operation of the diverse parts of the wind profiler 50. An integrator board receives the digital output of the A-to-D conversion in the interface 64 and performs dual channels of coherent addition as part of the signal processing. A high speed serial transfer of the data from the integrator board is sent to a radar Digital Signal Processor (DSP) board. The radar DSP board handles the averaging, the conversion from time domain to frequency domain, the windowing, the ground clutter removal, and other parts of the signal processing sequence. Finally, an Ethernet board handles the high-speed networked data transfer and communication between the radar computer 68 and the remote computer 72.

The remote computer 72 is used to remotely supervise and control the wind profiler 50, assign levels of quality control on the data, change the format of the data, and create a variety of graphic data presentations. The remote computer 72 also receives data from the profiler monitor 60. Like the radar computer 68, the remote computer 72 is typically a 486 DX ISA personal computer. An ethernet card is installed in the remote computer 72 so as to network it with the radar computer 68.

At this point it should be noted that the remote computer 72 is also used to control the phased array acoustic antenna 36 so as to perform RASS functions. This control is administered via communication line 44, which corresponds to the communication line 44 as shown in FIG. 7. It should also be noted that wind profiling radar system 50 corresponds to the combined wind profiling radar/RASS control electronics 34, the phased array radar antenna 38, and communication line 42 as shown in FIG. 7. It should further be noted that the SODAR control electronics 32, the combined wind profiling radar/RASS control electronics 34, and communication line 44 as shown in FIG. 7 may all be combined so as to form the combined wind profiling radar/RASS/SODAR control electronics 12 as shown in FIG. 6. Finally, it should be noted that the radar computer 68 and video monitor 66 may be combined with remote computer 72 and video monitor 74, respectively, if so desired. Thus, a combined radar/remote computer may be utilized to perform all of the corresponding above-stated functions.

With the hardware of the wind profiling radar system 50 now described, a brief description of the control flow and the signal/data flow within the wind profiling radar system 50 will now be given followed by a more detailed description of how the wind profiling radar system 50 operates.

Figure 11:
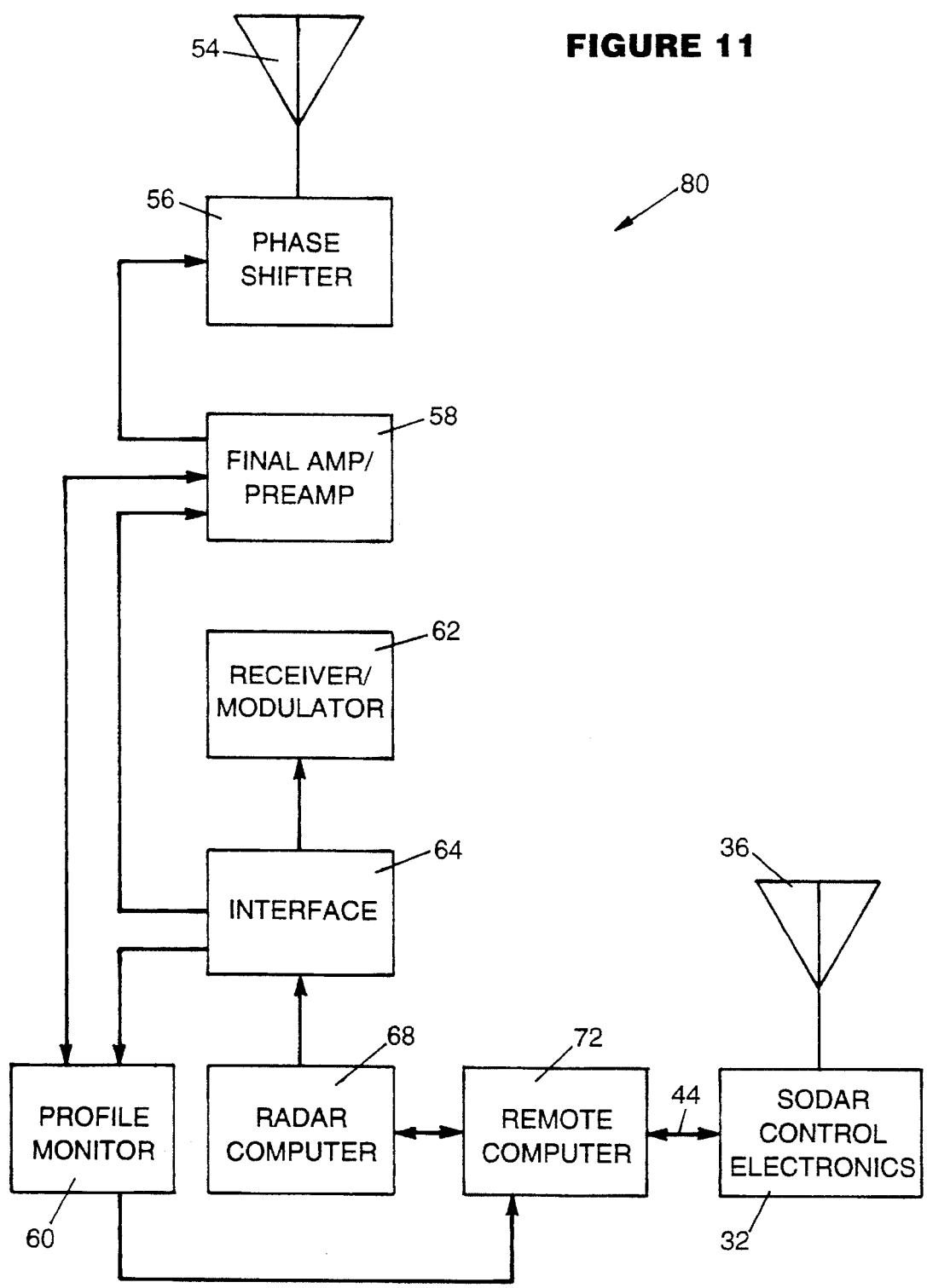
FIG. 11 is a flow chart indicating the control flow within the wind profiling radar system of FIG. 8.

Referring to FIG. 11, there is shown a flow chart 80 indicating the control flow within the wind profiling radar system 50. The coordination and timing of the activities involved in wind profiling are initiated by the radar computer 68. Radar control software reads radar parameters from a file that can be edited through the interface 64. The information in this file is then translated into signals which are necessary to execute sampling that is required. Pulse sequences used for RF pulse and phase modulation, receiver blanking, and range sampling (using the dual A/D converters) originate in the radar controller board, which resides in the radar computer 68. These signals are passed to the interface 64 where the first three are buffered and passed to the receiver/modulator 62.

Control signals that determine the receiver matched filter bandwidth and the antenna pointing direction also originate in the radar controller board. These signals are also buffered in the interface 64. Bandwidth control is passed to the receiver/modulator 62. The antenna control is passed to the final amplifier/preamplifier 58 and then to the antenna phase shifter 56.

Another set of antenna control signals and an RF pulse-modulated signal are sent from the interface 64 to the profiler monitor 60 and from there to a monitoring system in the final amplifier/preamplifier 58. The antenna signals are used to tell the profiler monitor 60 of expected antenna control information. The RF pulse modulation control signal is used to synchronize measurement of the amplifier peak output and signal level reflected by the antenna system.

The profiler monitor 60 and the monitor system in the final amplifier/preamplifier 58 transact serial information using RS-422 protocol about status and control to implement the system monitoring function.

The remote computer 72 allows remote control of the profiler system through editing of the radar parameter files. The remote computer 72 also allows remote control of the phased array acoustic antenna 36 so as to perform RASS functions. The remote computer 72 is linked to the radar computer 68 by ethernet and to the SODAR control electronics 32 via communication line 44. Thus, a remote user may stop radar operation, change radar parameter files, perform computer administration tasks, and/or control RASS operations.

The remote computer 72 also receives serial status information from the profiler monitor 60. The serial status information initiates system shutdown in the event of monitor measurements that are out of tolerance. The remote computer 72 also logs this information for remote access.

Figure 12:
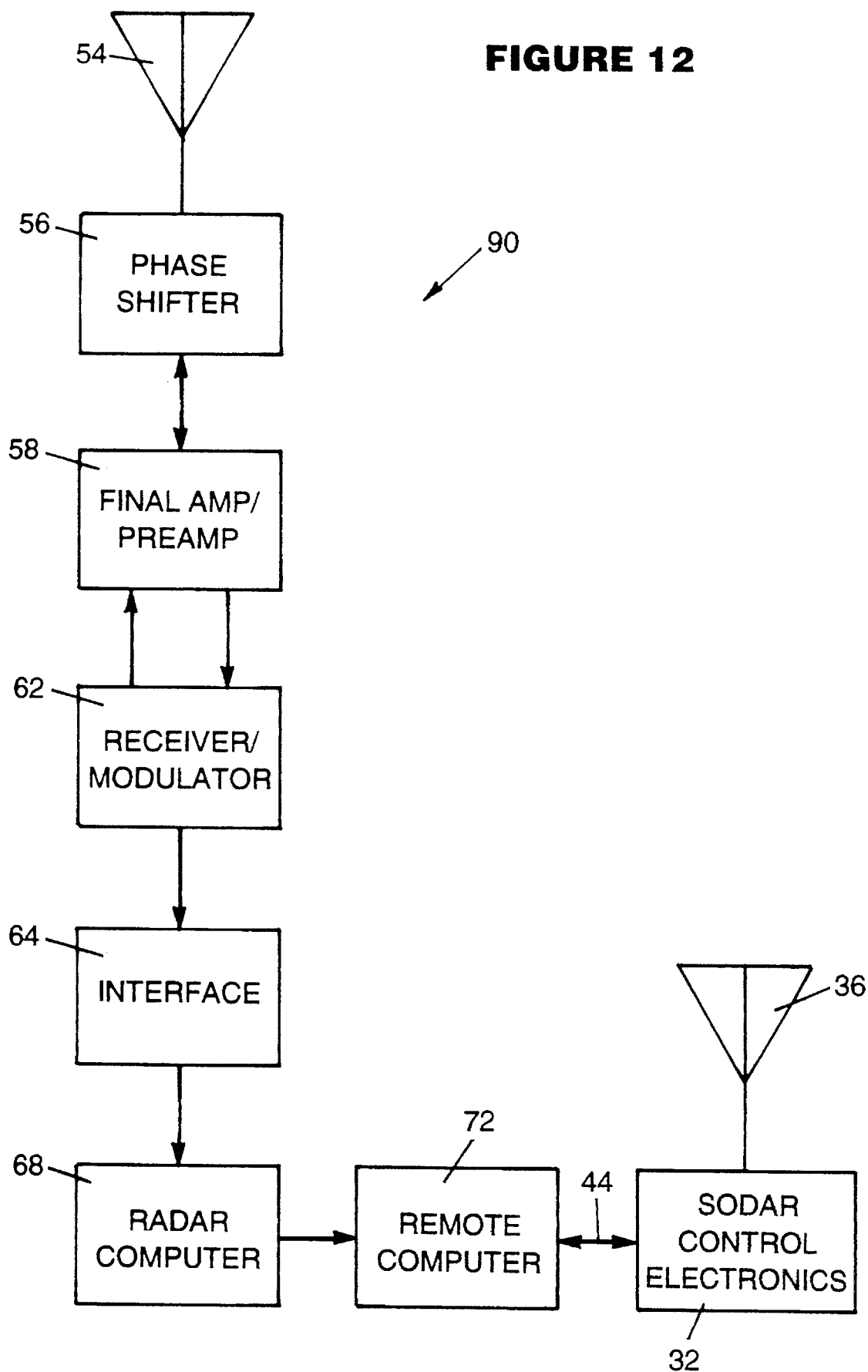
FIG. 12 is a flow chart indicating the signal/data flow within the wind profiling radar system of FIG. 8.

Referring to FIG. 12, there is shown a flow chart 90 indicating the signal/data flow within the wind profiling radar system 50. A transmit RF pulse at the IF frequency (60 MHz) is created in the receiver/modulator 62. This signal is sent to the final amplifier/preamplifier 58 where it is converted up to 915 MHz, amplified, and sent to the phase shifter 56 and to the antenna panels 54. From the antenna panels 54, the signal is radiated into the atmosphere.

The atmospheric backscatter is received by the antenna panels 54 and it is returned to the final amplifier/preamplifier 58 where it is amplified and converted down to the IF frequency (60 MHz). The processed backscatter signal is then sent to the receiver/modulator 62 where it is further processed and converted to quadrature detected signals.

The detected signals go to the interface 64 where they are A-to-D converted. The digital value is transferred to the integrator board in the radar computer 68. The signal processing steps of coherent averaging, DC voltage removal, time-to-frequency conversion, windowing, spectral averaging, moments calculation, and consensus averaging, which will be described below in more detail, occur in the radar computer 68.

The data products (spectral, moments or consensus data) are transferred to the remote computer 72 for user access. The remote computer 72 also sends acoustic signal data to the SODAR control electronics 32 for RASS operation. This acoustic signal data is sent via communication line 44.

Figure 13:
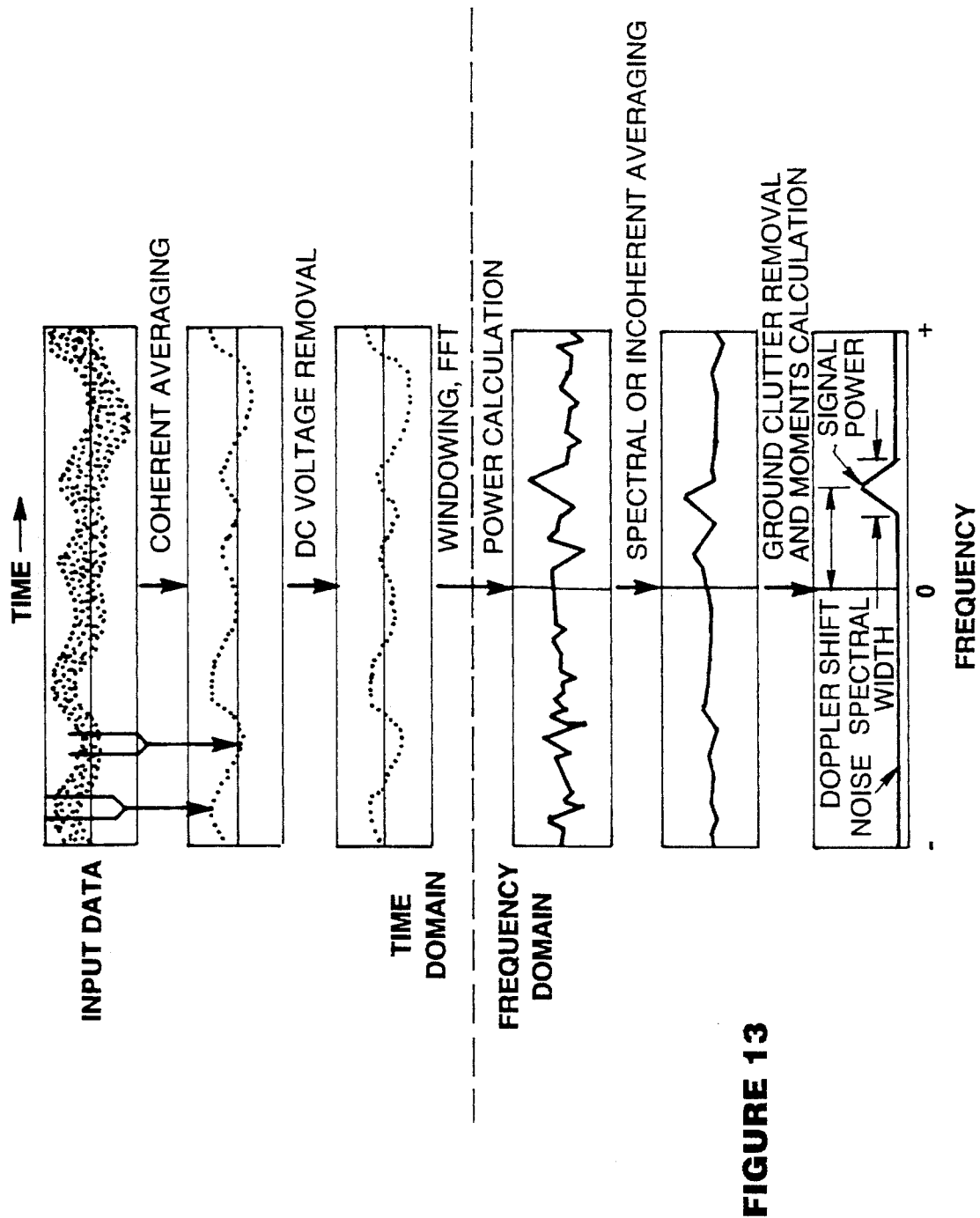
FIG. 13 is a flow chart showing the signal processing steps in the wind profiling radar system of FIG. 8.

Referring to FIG. 13, there is shown a flow chart 100 showing the signal processing in the wind profiling radar system 50. The signal processing that the samples undergo is divided into two stages: 1.) the time-domain stage; and 2.) the frequency-domain stage. In the time-domain stage, the samples are averaged. Time-domain averaging is also called coherent averaging because the samples come from targets that are more or less fixed in relation to each other during the time the sample was taken and because the sample is taken using a coherent measurement system.

As a general concept, a longer "dwell" time improves data quality. However, it is possible to choose an averaging time that is so long that it reduces the highest speed of radial wind measurements, also called the full-scale velocity, detected by the wind profiler, resulting in a radial wind measurement that may be out of the range required by the user. In actuality, the number of samples taken is determined by the desired velocity range measured, the inter-pulse period, and the frequency of the radar. Operators must estimate the highest possible radial wind speed that might occur and choose a number that will allow the wind profiler to correctly detect that wind velocity if it does occur.

After coherent averaging, the DC offset voltage is removed by mathematical signal processing techniques. At this point, the time-domain stage of signal processing is complete.

In the second stage of signal processing, the sample is converted from the time domain to the frequency domain by a computer algorithm called a Fast Fourier Transform (FFT), and then averaged to better define the peak of the sample. The averaging is called either spectral averaging or incoherent averaging.

The operator chooses the number of FFT points that are used in the FFT algorithm. The more FFT points used, the finer the velocity resolution. Unfortunately, the number of FFT points also helps determine the length of time necessary to acquire a spectral sample. A typical number of FFT points chosen is 64 for wind data, 2048 for RASS data. If the FFT point number chosen is doubled to 128, then the coherent averaging time is also doubled. The next segment of signal processing uses a technique called "windowing," which is then used to reduce some of the mathematical artifacts of the FFT processing. After windowing, mathematical signal processing techniques are used to remove ground clutter, which is backscatter from stationary targets, such as buildings, power lines, and towers.

The next processing step is spectral averaging. The operator must select the number of spectral averages that are used in the final average used in moments selection. The IPP, the number of coherent averages, the number of FFT points, and the number of spectral averages determine the dwell time, also called the averaging time. Generally, operators should choose values that create a dwell time of 20 to 30 seconds. Averaged spectral data is called spectral data or just spectra, and the radar computer 68 saves the spectral data in data files. The spectral data files also contain complete moments information.

Figure 14:
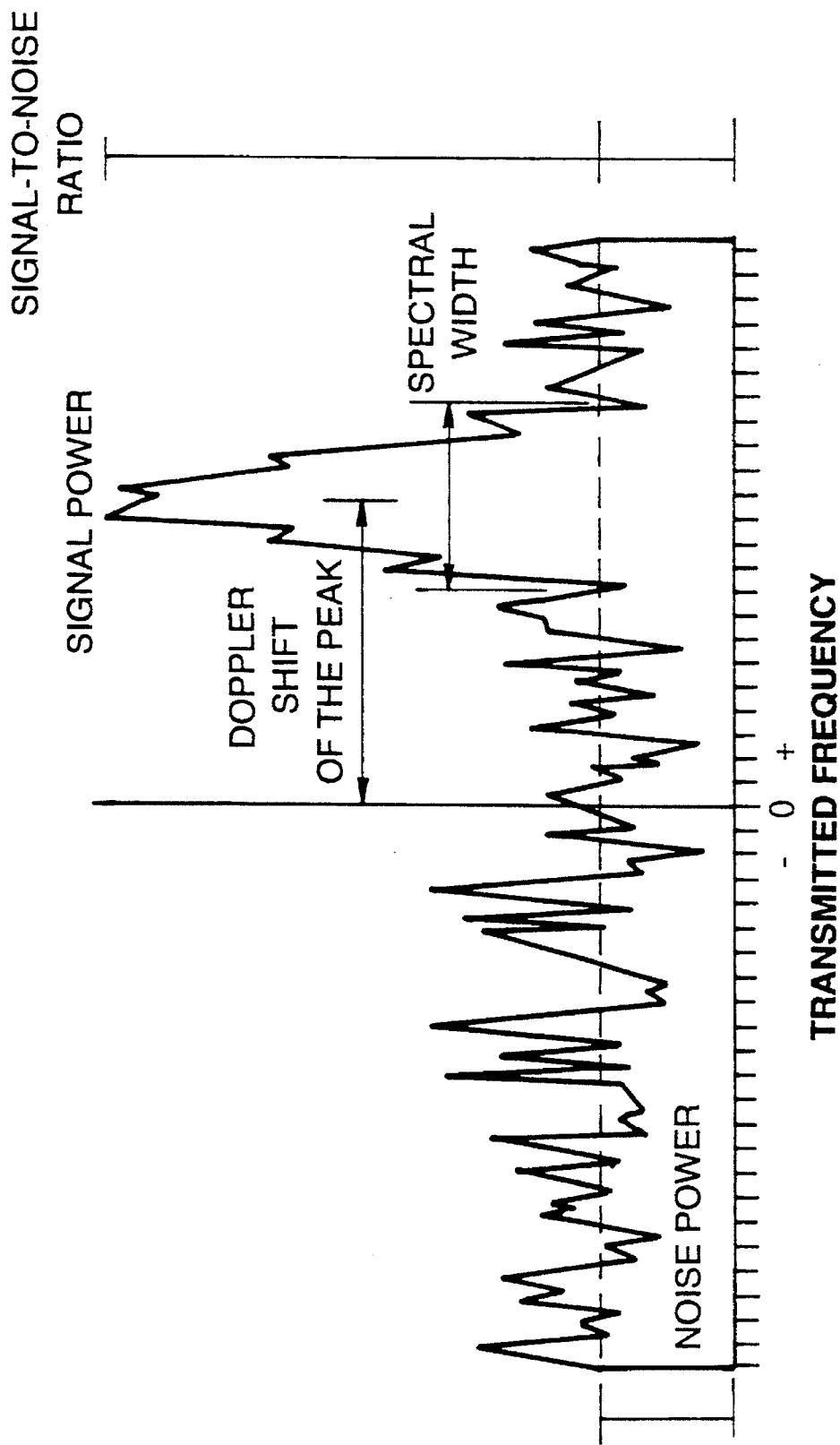
FIG. 14 is a diagram of a spectrum showing the four measurements for moment data.

Four quantities are calculated for each set of spectrally averaged data during the frequency-domain stage: 1.) the Doppler shift of the peak; 2.) the spectral width; 3.) the noise power; and 4.) the signal-to-noise ratio. The results from these calculations is called moment data, or just moments, and the radar computer 68 saves this data in data files. Referring to FIG. 14, there is shown a diagram of a spectrum showing the four measurements required for moment data.

The moments and spectra are considered "raw" data. The profiler creates a third type of data file, the consensus file. The data in this file have been processed with a wind consensus averaging algorithm. The algorithm uses two values to determine whether data are valid. One value is a range in which the samples must fit. The second value is a percentage number of samples taken during the consensus period that must fit within that range before the consensus is accepted as valid. Both values are chosen by the operator.

The minimum and maximum height coverage of the profiler depend on a combination of several factors. Some of these factors are built into the profiler and, therefore, are beyond the control of the operator. These factors include: 1.) the wavelength of the radar; 2.) the size of the antenna; 3.) the amount of transmitted power; and 4.) the recovery rate of the electronics.

The wavelength a radar uses depends on the kind of measurements you want to make with the radar. The wind profiling radar system 50 shown in FIG. 8 was designed to provide atmospheric data from the lower atmosphere. Thus, the wind profiling radar system 50 typically uses a 915 MHz frequency, which has a 32.8 cm wavelength, or a 1290 MHz frequency, which has a 23.2 cm wavelength. These wavelengths detect small targets, which are most abundant in the lower atmosphere. The relatively small wavelength allows a relatively small antenna size. The standard configuration of the wind profiling radar system 50 has four antenna panels, typically 2.7 meters (8.9 ft.) square. For higher altitude coverage, lower frequencies may be utilized with these techniques such as 49 MHz or 50 MHz.

The aperture of the antenna, which is controlled largely by practical considerations, determines two other characteristics of the antenna: 1.) the beam width; and 2.) the antenna gain. The beam width, which is inversely proportional to the aperture, is about 10 degrees in the four-panel configuration. The antenna gain, simply explained as the effectiveness of the beam that the radar transmits, is directly proportional to the aperture. Thus, the small aperture of the profiler antenna produces a gain of about 25 dBi. In an effort to increase the height coverage of the profiler, the number of antenna panels may be increased from four to nine, creating a higher gain and narrower beam width. Using a 9-panel antenna also improves the quality of the data noticeably.

The amount of power used to transmit the pulse affects the height coverage of the profiler directly. In short, the more power used, the higher the height coverage. The amplifier of the profiler has an output of 600 Watts peak-power. The profiler has a duty-cycle capability of 0 to 14%, depending on the parameters chosen by the operators. Lower frequency profilers may use higher output power and/or longer duty cycles.

In summary, the first three factors (the wavelength the radar uses; the size of the antenna; and the transmitted power) combine to determine the maximum height coverage of the profiler. These factors are generally beyond the control of the operator.

The minimum height coverage is also affected by factors that are beyond the operator's control. The minimum height coverage is limited by the recovery rate of the profiler electronics. Also, some of the backscatter is returning to the profiler even before it has stopped transmitting the electromagnetic pulse and prepared itself for receiving. The earliest backscatter, typically from ground clutter, does not generate desirable data anyway. Unfortunately, the early backscatter is often quite strong and overwhelms the receiver's ability to ignore it and find the desirable data. Together, the limits of the receiver's recovery rate, which is fixed, and the initial ground clutter raise the minimum height coverage of the profiler.

Figure 15:
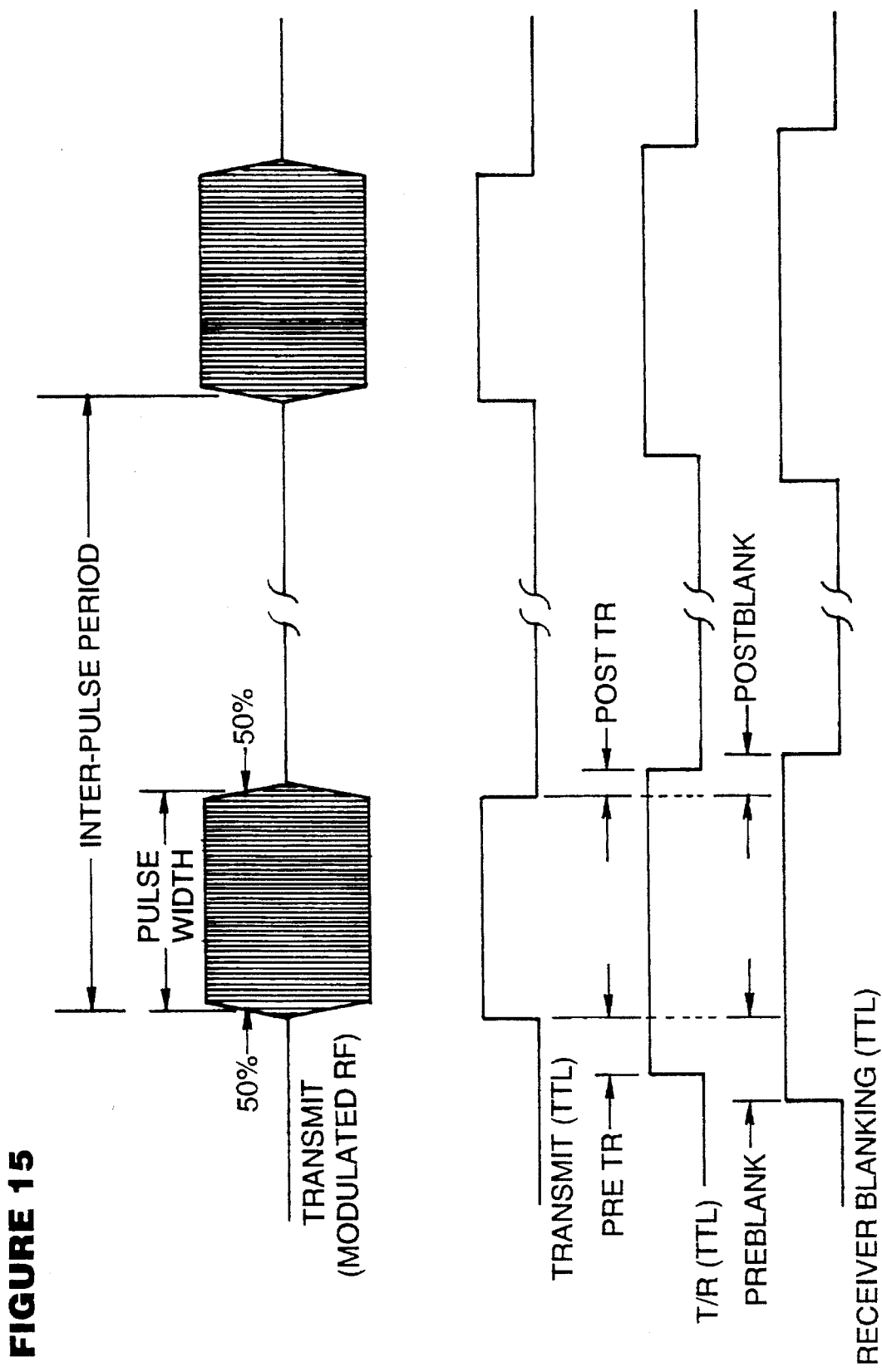
FIG. 15 is a timing diagram indicating an inter-pulse period and a pulse duration.

There are, however, two factors that the operator can control that affect the height coverage of the profiler. The first factor that affects the height coverage is the pulse duration, also called the pulse length, the pulse width, or the transmit pulse (see FIG. 15). Lengthening the pulse raises both the minimum and maximum height coverage. Many operators may choose the longest pulse possible to gather data from the highest range gates.

However, it is often desirable to obtain the highest maximum height coverage, the lowest minimum height coverage, and the finest range resolution possible. Unfortunately, the pulse duration that the operator selects to achieve the best performance level for maximum height coverage is the worst choice for minimum height coverage and fine range resolution. A long pulse duration raises both the minimum and maximum height coverage of the profiler, thereby making it good for the maximum height but bad for the minimum height and the range resolution. A short pulse duration is good for the range resolution and minimum height but bad for the maximum height.

The other operator-controlled factor is the inter-pulse period, called the IPP for short. The IPP is the time interval between any two pulses (see FIG. 15). First glance at the IPP suggests making the IPP as long as possible to give the backscatter from the higher reaches of the atmosphere time to return to the profiler for a higher range. But in reality, lengthening the IPP decreases the profiler's duty cycle, that is, the amount of time the profiler is transmitting compared to the amount of time the profiler is "listening." Decreasing the duty cycle decreases the average power the profiler is producing, and decreasing the average power reduces the available height range of the profiler. Decreasing the IPP, that is, shortening the time interval between the pulses, raises the profiler's height coverage. However, operators must select an IPP that is not less than the height range they wish to sample. In other words, if the IPP is too short, the height coverage is decreased. Stretching the time between the pulses allows the backscatter from the higher elevations the time necessary to return to the wind profiler.

Choosing an IPP that is too short also has detrimental effect when the backscatter from a desired height is returning concurrently with the backscatter from a second pulse (or after the profiler has begun sampling data from a second pulse). The backscatter from the second pulse is coming from a lower height than the backscatter from the first pulse. Now the same range gate contains data from two different heights, so data are compromised. This is sometimes called range aliasing.

Figure 16:
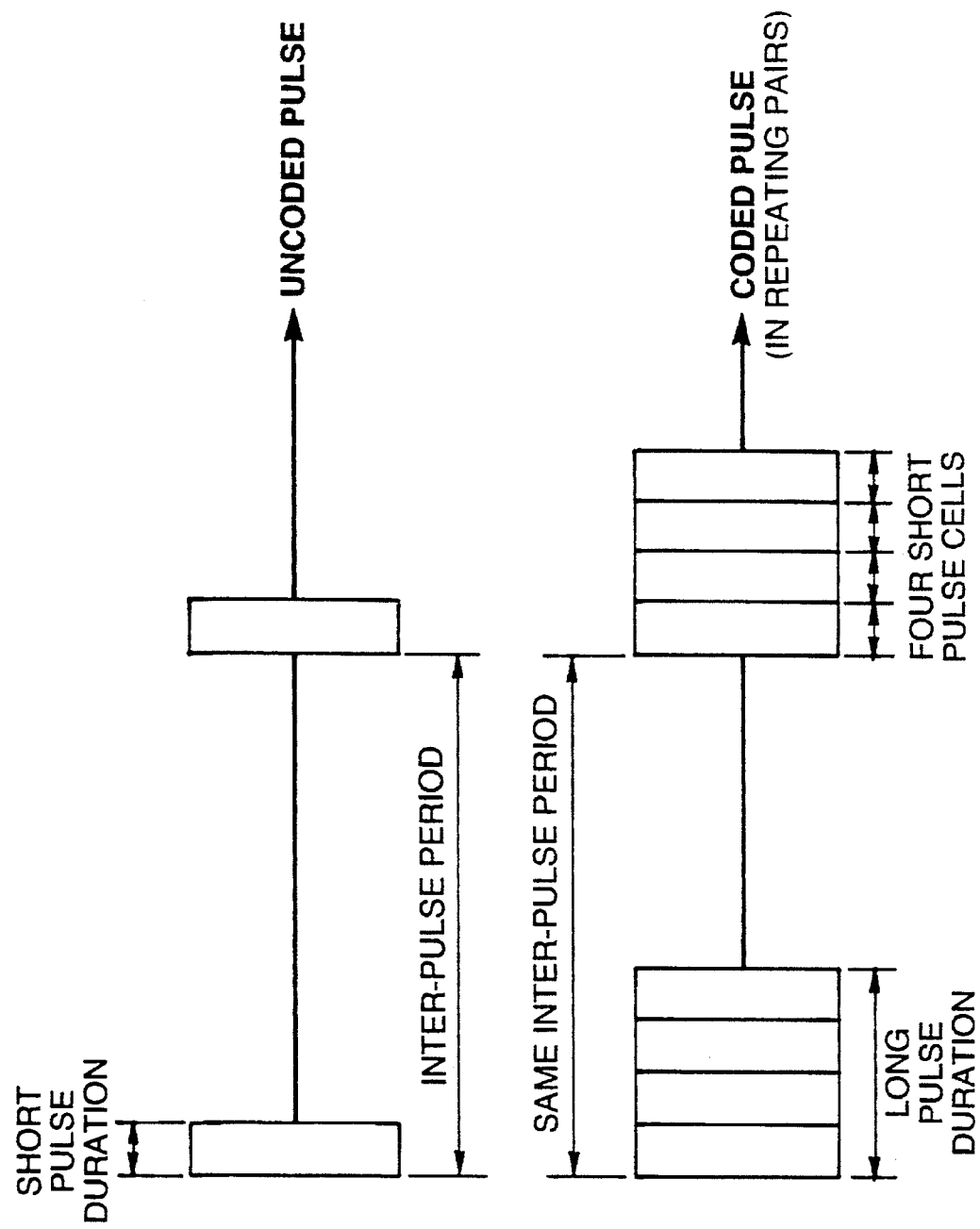
FIG. 16 is a timing diagram showing a coded pulse and an uncoded pulse.

A solution that resolves some of these limitations is pulse coding (see FIG. 16). Instead of transmitting one simple pulse, the profiler transmits a pulse composed of a series of complementary, phase-coded pulse cells connected to each other to form one long pulse. The pulse cells are transmitted in a known sequence and with a known relationship to each other; in other words, they are coded. The operator can choose a pulse duration that has 2, 4, 8, 10, or 16 times. However, the pulse duration must not exceed 12 microseconds. A longer pulse duration allows the user to increase the wind profiler's duty cycle, which boosts the maximum height coverage.

At the same time the profiler is using a longer pulse duration to boost the maximum height coverage, the profiler is computing a fine range resolution from the individual pulse cells, which are shorter, rather than from the entire pulse. Because the codes are complementary (in pairs), the operator is required to select values of coherent averaging that are multiples of 2. If the lowest possible height coverage of the profiler is a high priority, the operator can choose to use an uncoded pulse instead of a coded pulse. Most often, operators compromise among the desired characteristics (i.e. low and high height coverage and fine range resolution).

After operators have chosen the IPP, the number of pulse code cells, and the transmit pulse, the next set of decisions the operators make will affect how the altitude samples are taken. The first choice is the sampling delay, which determines the first height sampled by the profiler. The sampling delay is the time interval between the end of the transmit pulse and the first range gate (see FIG. 17). This value is corrected in the calculation of height for the instrumental delay inherent in the profiler. The value chosen should not result in a first sample height of less than 120 meters.

Figure 17:
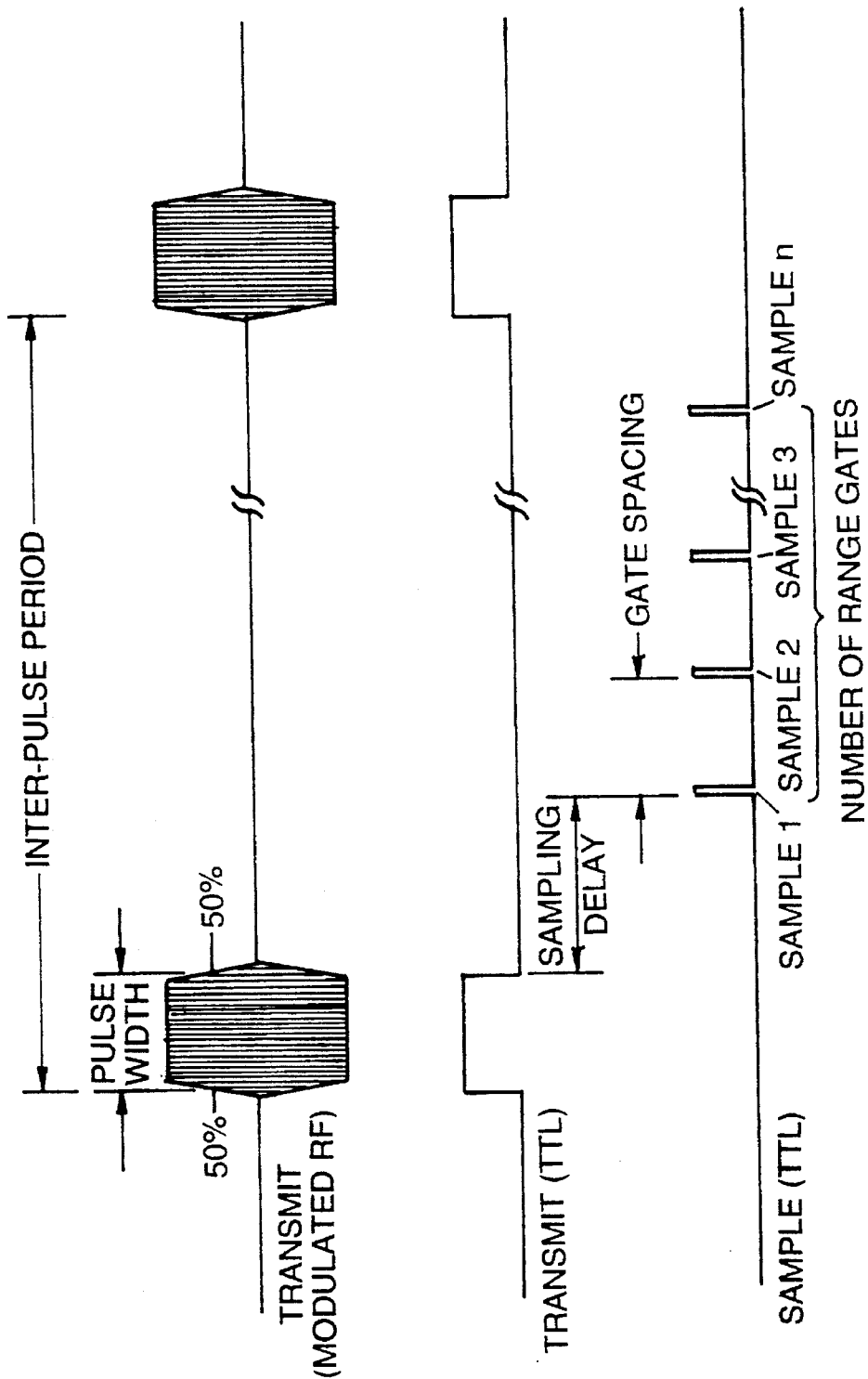
FIG. 17 is a timing diagram showing a sampling delay and a gate spacing.

The second choice is gate spacing, which is the altitude difference between the range gates (see FIG. 17). Gate spacing is typically the same interval as the transmit pulse. If pulse coding is used, then gate spacing must be the same interval as the transmit pulse. Sometimes operators may choose a gate spacing that is less than the transmit pulse. This results in a backscatter-weighted average over the volume corresponding to the pulse duration.

The third choice is the number of range gates (see FIG. 17). The number of range gates represents the number of range samples collected for each pulse. This value determines the maximum altitude that measurements are collected. Operators should choose a reasonable number that reflects achievable expectations for the atmospheric conditions at the site.

At this point it should be noted that all of the factors mentioned above are interrelated. Thus, by changing any one of the above-mentioned parameters, one or more of the other above-mentioned parameters may change accordingly.

Generally, the profiler takes wind velocity data for the largest portion of an averaging period and virtual temperature data for the remaining portion. Transmitting for fifty minutes in wind mode and 10 minutes in RASS mode is a common arrangement. However, the averaging periods may be 20 or 30 minutes, or as little as several minutes.

The RASS has the same resolution and minimum height coverage as the wind profiler, but the RASS's maximum height coverage is only 1 to 2 kilometers at 915 MHz because the atmosphere absorbs acoustic waves more readily than electromagnetic waves. In contrast, lower frequency RASS systems can allow temperature measurements up to 12 to 15 kilometers. However, as previously mentioned, the use of a phased array acoustic antenna allows an acoustic beam to be steered into the wind so as to compensate for strong winds, which can transport an acoustic signal out of vertical alignment with a corresponding radar antenna beam. Thus, the use of a phased array acoustic antenna maximizes the acoustic energy in the direction of the RF transmission and potentially increases the RASS sensitivity for a given level of acoustic power. Because the acoustic beam steering angle and direction need to be varied based on the current wind profile, and the RASS acoustic signal is fairly broadband, a digital time-delay beamformer, such as that described in U.S. patent application Ser. No. 08/288, 939, is the most technically feasible approach. In contrast, an analog phased array beamformer is generally more difficult to design for variable steering angles, and the angle will depend somewhat on the signal frequency.

Figure 18:
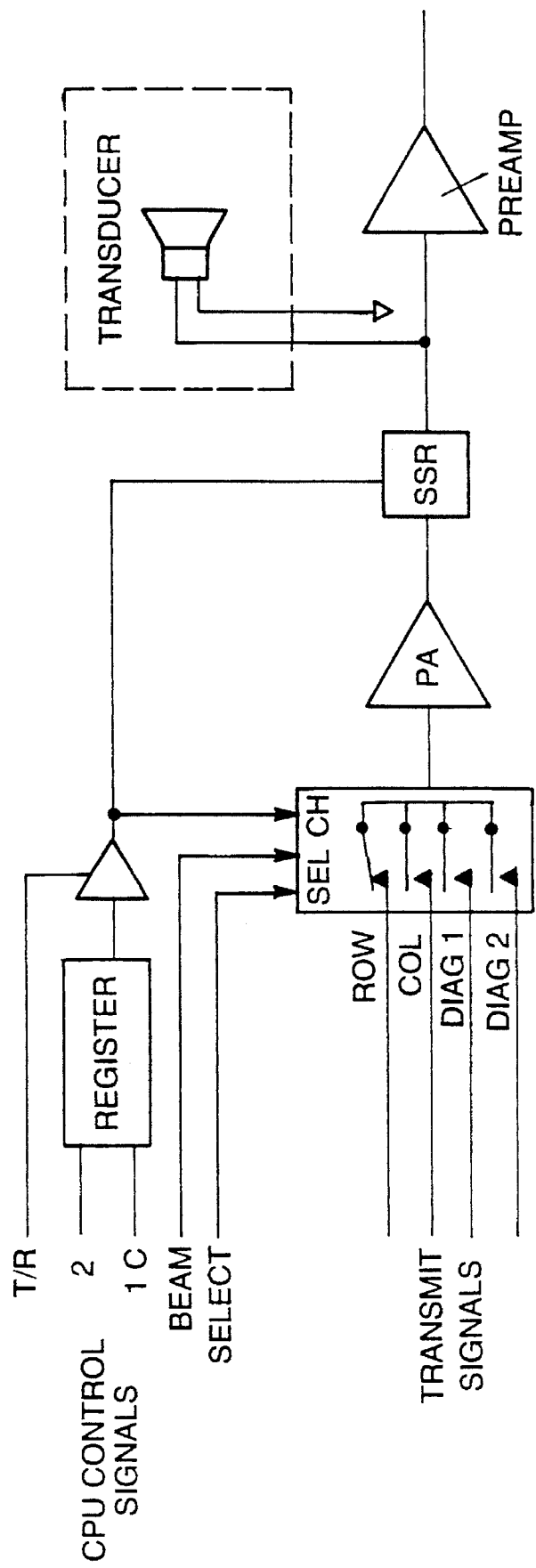
FIG. 18 is a schematic representation of one of a plurality of identical modified circuits on one of the eight amplifier boards in the phased array acoustic antenna system described in U.S. patent application Ser. No. 08/288,939.

By modifying the phased array acoustic antenna described in U.S. patent application Ser. No. 08/288,939 for nine beam transmit capability, all possible wind conditions should be accommodated. Such modification involves providing the ability to tilt acoustic beams along the diagonal axis of the array. This modification adds only slightly to the design complexity. The number of waveform generating digital-to-analog converters (DAC's) on the DAC board must be increased from 12 (the number of rows and columns) to 17 (the number of diagonal rows). The multiplexers on the amplifier boards (see FIG. 18) must be changed from two-channel to four channel (the number of multiplexer channels is based on the number of axes along which the beam is tilted). Finally, the backplane for distributing the 17 time-delayed transmit waveforms from the DAC board to the amplifier boards is more complex.

With the above-described modifications, the phased array acoustic antenna described in U.S. patent application Ser. No. 08/288,939 has the ability to tilt an acoustic beam over a 0–5 degree angle with resolution on the order of a degree. This capability is essential for precisely compensating for the effects of acoustic beam deflection due to wind.

It should be noted that the phased array acoustic antenna described in U.S. patent application Ser. No. 08/288,939 inherently allows for shared use for both SODAR and RASS operations.

Returning to the discussion of the capabilities of the wind profiling radar hardware, all the previously discussed quantities (i.e. pulse duration, IPP, coherent average, spectral averaging, sampling delay, and number of range gates) function the same for RASS as for wind measurement. The one exception is pulse coding, which RASS cannot easily use.

The maximum radial velocity must be greater than 350 m/s in order to measure the propagation velocity of the acoustic signal. The number of points used in the Fourier transform is increased to maintain velocity resolution with the increased maximum radial velocity. Typical values for maximum radial velocity are ≈400 m/s and 2048-point FFT when taking RASS data.

The operator must also choose the parts of the spectrum to select acoustic propagation peak and the vertical velocity peaks. To do this, the operator chooses a range of temperature and a velocity range. The interface calculates the velocity (FFT) bins that correspond to the chosen values.

The operator must also select the range of audio frequencies that are used. This involves choosing a range of temperature values. Again, the interface calculates the audio frequency range needed. If the operator chooses too large a range, the audio energy is spread over many useless frequencies, reducing the range coverage of RASS. If the operator chooses too small a range, no acoustic propagation peak is found.

Normal audio frequency values are chosen to accommodate diurnal temperature variation. The range for the acoustic propagation window in the spectrum is typically ±2° to 3° C. larger than the range of audio sweep.

The range performance of all profilers depends on atmospheric conditions, which can change dramatically and frequently at any time. An inexperienced operator, when confronted with a reduced height range or large "holes" in the data, will assume that the profiler is not working properly when, in fact, the profiler is working adequately but the atmospheric conditions have changed. The conditions that affect profiler performance are: 1.) humidity; 2.) turbulence; 3.) precipitation; 4.) high winds; and 5.) temperature.

The amount of moisture in the atmosphere affects the height range performance of the profiler. Generally, the more moisture there is, the better the profiler works for winds because the air has large refractive index variations. Often, wind data will show a band of range gates for which the profiler will give no values, even though the profiler is showing data in range gates above and below. This "hole" in the data is often caused by a layer of dry air, which can be verified by examination of corresponding radiosonde data. Because of the dryness of the air, data from profilers located in extremely cold places such as the high latitude regions often have such "holes." Marine environments make good profiler sites because of the volume of moisture usually prevalent in those regions.

The RASS benefits from high humidity levels also. When the atmosphere contains more moisture, there is less attenuation (decrease) of the acoustic wave.

The amount of turbulence in the atmosphere also affects the range performance of the profiler. The more turbulence there is in the atmosphere, particularly turbulence with a scale of one-half the profiler wavelength, the better the profiler works. The profiler has a low signal-to-noise ratio when the air is stable with laminar airflows, a condition commonly found at night, simply because there is a little thermally-created turbulence available to reflect the profiler's signals. On the other hand, regions around hills and mountains make good sites because the topography creates turbulence.

Convective conditions can produce strong turbulence and correspondingly good profiler data. However, highly localized convective conditions can produce erroneous data.

Turbulence, however, is not necessarily good for RASS. Turbulence can disrupt the coherence of the acoustic wavefront used for virtual temperature measurement, reducing the range obtained. The wavelength of the acoustic signal must match that of the radar signal in order to measure the velocity of propagation of the acoustic signal. Strong turbulence can reduce the acoustic signal.

Most types of precipitation such as rain, snow, and hail can affect the performance of the profiler. When precipitation moves in a direction that's different from the air around it, the vertical beam measures the movement of the hydrometeors rather than the vertical component of the wind. This is because precipitation returns stronger signals that clear air. The precipitation occurring during a thunderstorm can overwhelm the data collected from the regions above the storm, creating a "shadow" in the data. However, if the precipitation is carried with the wind, then the horizontal winds might still be measured because the particle velocity in the off-zenith beam can be corrected with the vertical beam measurement, assuming spatial homogeneity.

For RASS, virtual temperature measurements are usually not possible during precipitation. During precipitation, if the hydrometeor fall velocity is measured and it differs from the vertical wind velocity, the resulting virtual temperature measurements will be incorrect.

Ground clutter most often affects the quality of data in the lower range gates. High winds can cause clutter signals from objects such as trees and power lines to exhibit sufficient Doppler velocity width that the profiler's ability to screen out this clutter is overwhelmed. Choosing sites with minimal ground clutter will improve the range and data quality of the profiler.

As previously discussed, the use of the phased array acoustic antenna allows an acoustic beam to be steered into the wind so as to compensate for strong winds. Thus, the use of a phased array acoustic antenna maximizes the acoustic energy in the direction of the RF transmission and potentially increases the RASS sensitivity for a given level of acoustic power.

Lastly, temperature has much more of an effect on RASS than on the profiler. Acoustic attenuation varies as a function of temperature, humidity, and pressure. Cold dry air exhibits highest attenuation, which can exceed-40 dB per kilometer. Very cold or warm air propagates acoustic signals better, resulting in improved range for virtual temperature measurement.

With the present invention systems 10,30 now fully described, it can thus be seen that the primary objective set forth above is efficiently attained and, since certain changes may be made in the above-described systems 10,30 without departing from the scope of the invention, it is intended that all matter contained in the above description or shown in the accompanying drawings shall be interpreted as illustrative and not in a limiting sense.

What is claimed is:

1. A system of atmospheric remote sensing instruments comprising:

a phased array acoustic antenna, wherein said phased array acoustic antenna is responsive to a first acoustic transmit signal for providing a first directed beam of transmitted acoustic energy, wherein said phased array acoustic antenna is responsive to a second acoustic transmit signal for providing a second directed beam of transmitted acoustic energy, and wherein said phased array acoustic antenna is responsive to a reflected portion of said first directed beam of transmitted acoustic energy for providing an acoustic receive signal, said reflected portion of said first directed beam of transmitted acoustic energy being reflected by wind in the atmosphere;

a phased array radar antenna, wherein said phased array radar antenna is responsive to a first radar transmit signal for providing a first directed beam of transmitted electromagnetic energy, wherein said phased array radar antenna is responsive to a second radar transmit signal for providing a second directed beam of transmitted electromagnetic energy, wherein said phased array radar antenna is responsive to a backscattered portion of said first directed beam of transmitted electromagnetic energy for providing a first radar receive signal, said backscattered portion of said first directed beam of transmitted electromagnetic energy being backscattered by said second directed beam of transmitted acoustic energy, and wherein said phased array radar antenna is responsive to a backscattered portion of said second directed beam of transmitted electromagnetic energy for providing a second radar receive signal, said backscattered portion of said second directed beam of transmitted electromagnetic energy being backscattered by wind in the atmosphere; and control and processing means for generating said acoustic transmit signals and said radar transmit signals so as to temporally coordinate the use of said phased array acoustic antenna and said phased array radar antenna, respectively, said control and processing means being responsive to said acoustic receive signal for providing an indication of wind characteristics based on the characteristics of said reflected portion of said first directed beam of transmitted acoustic energy as compared to the characteristics of said first directed beam of transmitted acoustic energy, said control and processing means being responsive to said first radar receive signal for providing an indication of temperature characteristics based on the characteristics of said reflected portion of said first directed beam of transmitted electromagnetic energy as compared to the characteristics of said first directed beam of transmitted electromagnetic energy, said control and processing means being responsive to said second radar receive signal for providing an indication of wind characteristics based on the characteristics of said reflected portion of said second directed beam of transmitted electromagnetic energy as compared to the characteristics of said second directed beam of transmitted electromagnetic energy.

2. A system of atmospheric remote sensing instruments comprising:

a phased array acoustic antenna, wherein said phased array acoustic antenna is responsive to a first acoustic transmit signal for providing a first directed beam of transmitted acoustic energy, wherein said phased array acoustic antenna is responsive to a second acoustic transmit signal for providing a second directed beam of transmitted acoustic energy, and wherein said phased array acoustic antenna is responsive to a reflected portion of said first directed beam of transmitted acoustic energy for providing an acoustic receive signal, said reflected portion of said first directed beam of transmitted acoustic energy being reflected by wind in the atmosphere;

a phased array radar antenna, wherein said phased array radar antenna is responsive to a radar transmit signal for providing a directed beam of transmitted electromagnetic energy, wherein said phased array radar antenna is responsive to a backscattered portion of said directed beam of transmitted electromagnetic energy for providing a radar receive signal, said backscattered portion of said directed beam of transmitted electromagnetic energy being backscattered by said second directed beam of transmitted acoustic energy; and control and processing means for generating said acoustic transmit signals and said radar transmit signal so as to temporally coordinate the use of said phased array acoustic antenna and said phased array radar antenna, respectively, said control and processing means being responsive to said acoustic receive signal for providing an indication of wind characteristics based on the characteristics of said reflected portion of said first directed beam of transmitted acoustic energy as compared to the characteristics of said first directed beam of transmitted acoustic energy, said control and processing means being responsive to said radar receive signal for providing an indication of temperature characteristics based on the characteristics of said reflected portion of said directed beam of transmitted electromagnetic energy as compared to the characteristics of said directed beam of transmitted electromagnetic energy.

3. A system of atmospheric remote sensing instruments comprising:

a steerable acoustic antenna, wherein said steerable acoustic antenna is responsive to a first acoustic transmit signal for providing a first directed beam of transmitted acoustic energy, wherein said steerable acoustic antenna is responsive to a second acoustic transmit signal for providing a second directed beam of transmitted acoustic energy, and wherein said steerable acoustic antenna is responsive to a reflected portion of said first directed beam of transmitted acoustic energy for providing an acoustic receive signal, said reflected portion of said first directed beam of transmitted acoustic energy being reflected by wind in the atmosphere;

a steerable radar antenna, wherein said steerable radar antenna is responsive to a first radar transmit signal for providing a first directed beam of transmitted electromagnetic energy, wherein said steerable radar antenna is responsive to a second radar transmit signal for providing a second directed beam of transmitted electromagnetic energy, wherein said steerable radar antenna is responsive to a backscattered portion of said first directed beam of transmitted electromagnetic energy for providing a first radar receive signal, said backscattered portion of said first directed beam of transmitted electromagnetic energy being backscattered by said second directed beam of transmitted acoustic energy, and wherein said steerable radar antenna is responsive to a backscattered portion of said second directed beam of transmitted electromagnetic energy for providing a second radar receive signal, said backscattered portion of said second directed beam of transmitted electromagnetic energy being backscattered by wind in the atmosphere; and control and processing means for generating said acoustic transmit signals and said radar transmit signals so as to temporally coordinate the use of said steerable acoustic antenna and said steerable radar antenna, respectively, said control and processing means being responsive to said acoustic receive signal for providing an indication of wind characteristics based on the characteristics of said reflected portion of said first directed beam of transmitted acoustic energy as compared to the characteristics of said first directed beam of transmitted acoustic energy, said control and processing means being responsive to said first radar receive signal for providing an indication of temperature characteristics based on the characteristics of said reflected portion of said first directed beam of transmitted electromagnetic energy as compared to the characteristics of said first directed beam of transmitted electromagnetic energy, said control and processing means being responsive to said second radar receive signal for providing an indication of wind characteristics based on the characteristics of said reflected portion of said second directed beam of transmitted electromagnetic energy as compared to the characteristics of said second directed beam of transmitted electromagnetic energy.

4. The system as defined in claim 3, wherein said steerable acoustic antenna is a phased array acoustic antenna.

5. The system as defined in claim 3, wherein said steerable radar antenna is a phased array radar antenna.

6. A system of atmospheric remote sensing instruments comprising:

a steerable acoustic antenna, wherein said steerable acoustic antenna is responsive to a first acoustic transmit signal for providing a first directed beam of transmitted acoustic energy, wherein said steerable acoustic antenna is responsive to a second acoustic transmit signal for providing a second directed beam of transmitted acoustic energy, and wherein said steerable acoustic antenna is responsive to a reflected portion of said first directed beam of transmitted acoustic energy for providing an acoustic receive signal, said reflected portion of said first directed beam of transmitted acoustic energy being reflected by wind in the atmosphere;

a steerable radar antenna, wherein said steerable radar antenna is responsive to a radar transmit signal for providing a directed beam of transmitted electromagnetic energy, wherein said steerable radar antenna is responsive to a backscattered portion of said directed beam of transmitted electromagnetic energy for providing a radar receive signal, said backscattered portion of said directed beam of transmitted electromagnetic energy being backscattered by said second directed beam of transmitted acoustic energy; and control and processing means for generating said acoustic transmit signals and said radar transmit signal so as to temporally coordinate the use of said steerable acoustic antenna and said steerable radar antenna, respectively, said control and processing means being responsive to said acoustic receive signal for providing an indication of wind characteristics based on the characteristics of said reflected portion of said first directed beam of transmitted acoustic energy as compared to the characteristics of said first directed beam of transmitted acoustic energy, said control and processing means being responsive to said radar receive signal for providing an indication of temperature characteristics based on the characteristics of said reflected portion of said directed beam of transmitted electromagnetic energy as compared to the characteristics of said directed beam of transmitted electromagnetic energy.

7. The system as defined in claim 6, wherein said steerable acoustic antenna is a phased array acoustic antenna.

8. The system as defined in claim 6, wherein said steerable radar antenna is a phased array radar antenna.

9. A method for determining atmospheric conditions utilizing a system of atmospheric remote sensing instruments comprising:

(a) providing a phased array acoustic antenna, wherein said phased array acoustic antenna is responsive to a first acoustic transmit signal for providing a first directed beam of transmitted acoustic energy, wherein said phased array acoustic antenna is responsive to a second acoustic transmit signal for providing a second directed beam of transmitted acoustic energy, and wherein said phased array acoustic antenna is responsive to a reflected portion of said first directed beam of transmitted acoustic energy for providing an acoustic receive signal, said reflected portion of said first directed beam of transmitted acoustic energy being reflected by wind in the atmosphere;

(b) providing a phased array radar antenna, wherein said phased array radar antenna is responsive to a first radar transmit signal for providing a first directed beam of transmitted electromagnetic energy, wherein said phased array radar antenna is responsive to a second radar transmit signal for providing a second directed beam of transmitted electromagnetic energy, wherein said phased array radar antenna is responsive to a backscattered portion of said first directed beam of transmitted electromagnetic energy for providing a first radar receive signal, said backscattered portion of said first directed beam of transmitted electromagnetic energy being backscattered by said second directed beam of transmitted acoustic energy, and wherein said phased array radar antenna is responsive to a backscattered portion of said second directed beam of transmitted electromagnetic energy for providing a second radar receive signal, said backscattered portion of said second directed beam of transmitted electromagnetic energy being backscattered by wind in the atmosphere;

(c) generating said acoustic transmit signals and said radar transmit signals so as to temporally coordinate the use of said phased array acoustic antenna and said phased array radar antenna, respectively;

(d) processing said acoustic receive signal so as to provide an indication of wind characteristics based on the characteristics of said reflected portion of said first directed beam of transmitted acoustic energy as compared to the characteristics of said first directed beam of transmitted acoustic energy;

(e) processing said first radar receive signal so as to provide an indication of temperature characteristics based on the characteristics of said reflected portion of said first directed beam of transmitted electromagnetic energy as compared to the characteristics of said first directed beam of transmitted electromagnetic energy; and (f) processing said second radar receive signal so as to provide an indication of wind characteristics based on the characteristics of said reflected portion of said second directed beam of transmitted electromagnetic energy as compared to the characteristics of said second directed beam of transmitted electromagnetic energy.

10. The method as defined in claim 9, further comprising:

(g) repeating steps (c) through (f) for additional directed beams of acoustic and electromagnetic energy having a differing spatial orientations from the initial directed beams of acoustic and electromagnetic energy; and (h) combining the wind and temperature characteristics obtained from said additional directed beams of acoustic and electromagnetic energy with the wind and temperature characteristics obtained from said initial directed beams of acoustic and electromagnetic energy so as to determine wind vectors and temperature gradients in the planes of said additional and said initial beams.

11. A method for determining atmospheric conditions utilizing a system of atmospheric remote sensing instruments comprising:

(a) providing a phased array acoustic antenna, wherein said phased array acoustic antenna is responsive to a first acoustic transmit signal for providing a first directed beam of transmitted acoustic energy, wherein said phased array acoustic antenna is responsive to a second acoustic transmit signal for providing a second directed beam of transmitted acoustic energy, and wherein said phased array acoustic antenna is responsive to a reflected portion of said first directed beam of transmitted acoustic energy for providing an acoustic receive signal, said reflected portion of said first directed beam of transmitted acoustic energy being reflected by wind in the atmosphere;

(b) providing a phased array radar antenna, wherein said phased array radar antenna is responsive to a radar transmit signal for providing a directed beam of transmitted electromagnetic energy, wherein said phased array radar antenna is responsive to a backscattered portion of said directed beam of transmitted electromagnetic energy for providing a radar receive signal, said backscattered portion of said directed beam of transmitted electromagnetic energy being backscattered by said second directed beam of transmitted acoustic energy; and (c) generating said acoustic transmit signals and said radar transmit signal so as to temporally coordinate the use of said phased array acoustic antenna and said phased array radar antenna, respectively;

(d) processing said acoustic receive signal so as to provide an indication of wind characteristics based on the characteristics of said reflected portion of said first directed beam of transmitted acoustic energy as compared to the characteristics of said first directed beam of transmitted acoustic energy;

(e) processing said radar receive signal for providing an indication of temperature characteristics based on the characteristics of said reflected portion of said directed beam of transmitted electromagnetic energy as compared to the characteristics of said directed beam of transmitted electromagnetic energy.

12. The method as defined in claim 11, further comprising:

(f) repeating steps (c) through (e) for additional directed beams of acoustic and electromagnetic energy having a differing spatial orientations from the initial directed beams of acoustic and electromagnetic energy; and (g) combining the wind and temperature characteristics obtained from said additional directed beams of acoustic and electromagnetic energy with the wind and temperature characteristics obtained from said initial directed beams of acoustic and electromagnetic energy so as to determine wind vectors and temperature gradients in the planes of said additional and said initial beams.

13. A method for determining atmospheric conditions utilizing a system of atmospheric remote sensing instruments comprising:

(a) providing a steerable acoustic antenna, wherein said steerable acoustic antenna is responsive to a first acoustic transmit signal for providing a first directed beam of transmitted acoustic energy, wherein said steerable acoustic antenna is responsive to a second acoustic transmit signal for providing a second directed beam of transmitted acoustic energy, and wherein said steerable acoustic antenna is responsive to a reflected portion of said first directed beam of transmitted acoustic energy for providing an acoustic receive signal, said reflected portion of said first directed beam of transmitted acoustic energy being reflected by wind in the atmosphere;

(b) providing a steerable radar antenna, wherein said steerable radar antenna is responsive to a first radar transmit signal for providing a first directed beam of transmitted electromagnetic energy, wherein said steerable radar antenna is responsive to a second radar transmit signal for providing a second directed beam of transmitted electromagnetic energy, wherein said steerable radar antenna is responsive to a backscattered portion of said first directed beam of transmitted electromagnetic energy for providing a first radar receive signal, said backscattered portion of said first directed beam of transmitted electromagnetic energy being backscattered by said second directed beam of transmitted acoustic energy, and wherein said steerable radar antenna is responsive to a backscattered portion of said second directed beam of transmitted electromagnetic energy for providing a second radar receive signal, said backscattered portion of said second directed beam of transmitted electromagnetic energy being backscattered by wind in the atmosphere;

(c) generating said acoustic transmit signals and said radar transmit signals so as to temporally coordinate the use of said steerable acoustic antenna and said steerable radar antenna, respectively;

(d) processing said acoustic receive signal so as to provide an indication of wind characteristics based on the characteristics of said reflected portion of said first directed beam of transmitted acoustic energy as compared to the characteristics of said first directed beam of transmitted acoustic energy;

(e) processing said first radar receive signal so as to provide an indication of temperature characteristics based on the characteristics of said reflected portion of said first directed beam of transmitted electromagnetic energy as compared to the characteristics of said first directed beam of transmitted electromagnetic energy; and (f) processing said second radar receive signal so as to provide an indication of wind characteristics based on the characteristics of said reflected portion of said second directed beam of transmitted electromagnetic energy as compared to the characteristics of said second directed beam of transmitted electromagnetic energy.

14. The method as defined in claim 13, further comprising:

(g) repeating steps (c) through (f) for additional directed beams of acoustic and electromagnetic energy having a differing spatial orientations from the initial directed beams of acoustic and electromagnetic energy; and (h) combining the wind and temperature characteristics obtained from said additional directed beams of acoustic and electromagnetic energy with the wind and temperature characteristics obtained from said initial directed beams of acoustic and electromagnetic energy so as to determine wind vectors and temperature gradients in the planes of said additional and said initial beams.

15. A method for determining atmospheric conditions utilizing a system of atmospheric remote sensing instruments comprising:

(a) providing a steerable acoustic antenna, wherein said steerable acoustic antenna is responsive to a first acoustic transmit signal for providing a first directed beam of transmitted acoustic energy, wherein said steerable acoustic antenna is responsive to a second acoustic transmit signal for providing a second directed beam of transmitted acoustic energy, and wherein said steerable acoustic antenna is responsive to a reflected portion of said first directed beam of transmitted acoustic energy for providing an acoustic receive signal, said reflected portion of said first directed beam of transmitted acoustic energy being reflected by wind in the atmosphere;

(b) providing a steerable radar antenna, wherein said steerable radar antenna is responsive to a radar transmit signal for providing a directed beam of transmitted electromagnetic energy, wherein said steerable radar antenna is responsive to a backscattered portion of said directed beam of transmitted electromagnetic energy for providing a radar receive signal, said backscattered portion of said directed beam of transmitted electromagnetic energy being backscattered by said second directed beam of transmitted acoustic energy; and (c) generating said acoustic transmit signals and said radar transmit signal so as to temporally coordinate the use of said steerable acoustic antenna and said steerable radar antenna, respectively;

(d) processing said acoustic receive signal so as to provide an indication of wind characteristics based on the characteristics of said reflected portion of said first directed beam of transmitted acoustic energy as compared to the characteristics of said first directed beam of transmitted acoustic energy;

(e) processing said radar receive signal for providing an indication of temperature characteristics based on the characteristics of said reflected portion of said directed beam of transmitted electromagnetic energy as compared to the characteristics of said directed beam of transmitted electromagnetic energy.

16. The method as defined in claim 15, further comprising:

(f) repeating steps (c) through (e) for additional directed beams of acoustic and electromagnetic energy having a differing spatial orientations from the initial directed beams of acoustic and electromagnetic energy; and (g) combining the wind and temperature characteristics obtained from said additional directed beams of acoustic and electromagnetic energy with the wind and temperature characteristics obtained from said initial directed beams of acoustic and electromagnetic energy so as to determine wind vectors and temperature gradients in the planes of said additional and said initial beams.

* * * * *